(12) United States Patent
Nagase et al.

(10) Patent No.: US 8,212,908 B2
(45) Date of Patent: Jul. 3, 2012

(54) TIMING GENERATOR AND IMAGE SCANNING APPARATUS

(75) Inventors: Masaki Nagase, Kanagawa (JP); Tohru Kanno, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 612 days.

(21) Appl. No.: 12/365,510

(22) Filed: Feb. 4, 2009

(65) Prior Publication Data

US 2009/0213261 A1 Aug. 27, 2009

(30) Foreign Application Priority Data

Feb. 27, 2008 (JP) .................................. 2008-046751

(51) Int. Cl.
*H04N 3/14* (2006.01)
*H04N 5/335* (2006.01)

(52) U.S. Cl. .......................... 348/312; 348/321; 348/323

(58) Field of Classification Search .................. 348/312, 348/321, 323–324
See application file for complete search history.

(56) References Cited

U.S. PATENT DOCUMENTS

| | | | |
|---|---|---|---|
| 5,408,113 A | 4/1995 | Kanno et al. | |
| 5,754,215 A * | 5/1998 | Kataoka et al. | 347/235 |
| 6,198,349 B1 | 3/2001 | Kanno et al. | |
| 6,426,804 B1 | 7/2002 | Kanno et al. | |
| 7,375,864 B2 | 5/2008 | Kanno | |
| 7,855,742 B2 * | 12/2010 | Oshima et al. | 348/294 |
| 2004/0013321 A1 * | 1/2004 | Ohkawa | 382/325 |
| 2007/0188638 A1 | 8/2007 | Nakazawa et al. | |
| 2008/0024842 A1 | 1/2008 | Tsukahara et al. | |
| 2008/0068467 A1 | 3/2008 | Kanno et al. | |
| 2008/0068683 A1 | 3/2008 | Kanno | |
| 2008/0106748 A1 | 5/2008 | Tsukahara et al. | |
| 2008/0212146 A1 | 9/2008 | Tsukahara et al. | |
| 2008/0231918 A1 | 9/2008 | Nagase | |
| 2008/0252787 A1 | 10/2008 | Nakazawa et al. | |
| 2008/0297616 A1 | 12/2008 | Nagase et al. | |

FOREIGN PATENT DOCUMENTS

| | | |
|---|---|---|
| JP | 2000-125120 | 4/2000 |
| JP | 2001-223842 | 8/2001 |
| JP | 2002-171386 | 6/2002 |
| JP | 2005-167467 | 6/2005 |
| JP | 2006-180260 | 7/2006 |
| JP | 2006-340117 | 12/2006 |

OTHER PUBLICATIONS

Japanese Office Action issued Dec. 27, 2011 in patent application No. 2008-046751.

* cited by examiner

*Primary Examiner* — Ricky Mack
*Assistant Examiner* — Brandi Thomas
(74) *Attorney, Agent, or Firm* — Oblon, Spivak, McClelland, Maier & Neustadt, L.L.P.

(57) ABSTRACT

A clock output from a quartz oscillator is input to a timing generator via a spread spectrum clock generator that spreads the spectrum of the clock. The clock is multiplexed by a phase locked loop to generate pixel clocks having the same frequency as a pixel frequency. The pixel clock is input to a delay locked loop, which generates a multi-layer clock by dividing each cycle of the pixel clock by 60. Clock generating units select a required phase from the multi-layer clock, thereby generating a timing signal. The phase, the pulse width, and the output period of the timing signal are controlled as desired by setting appropriate values to a register.

8 Claims, 24 Drawing Sheets

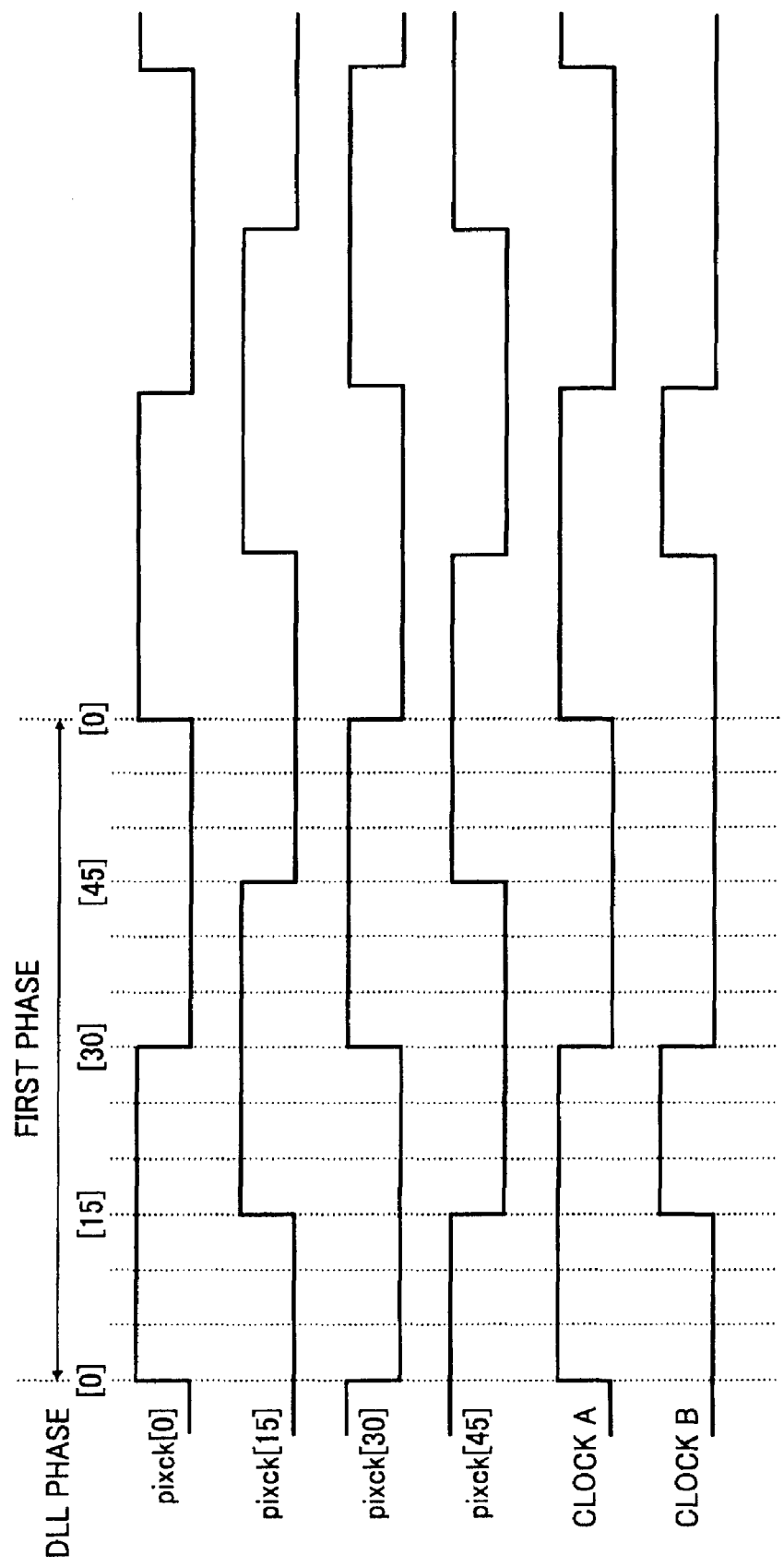

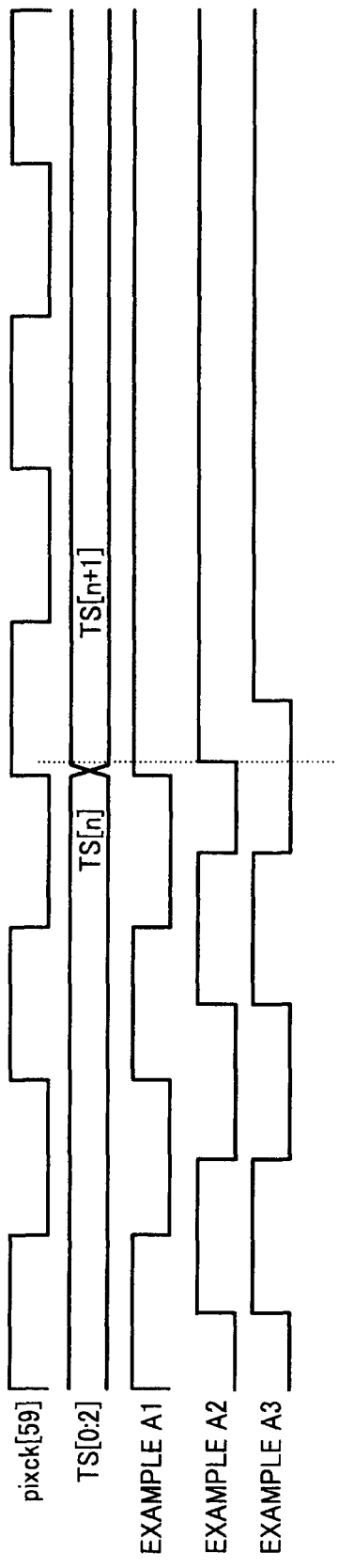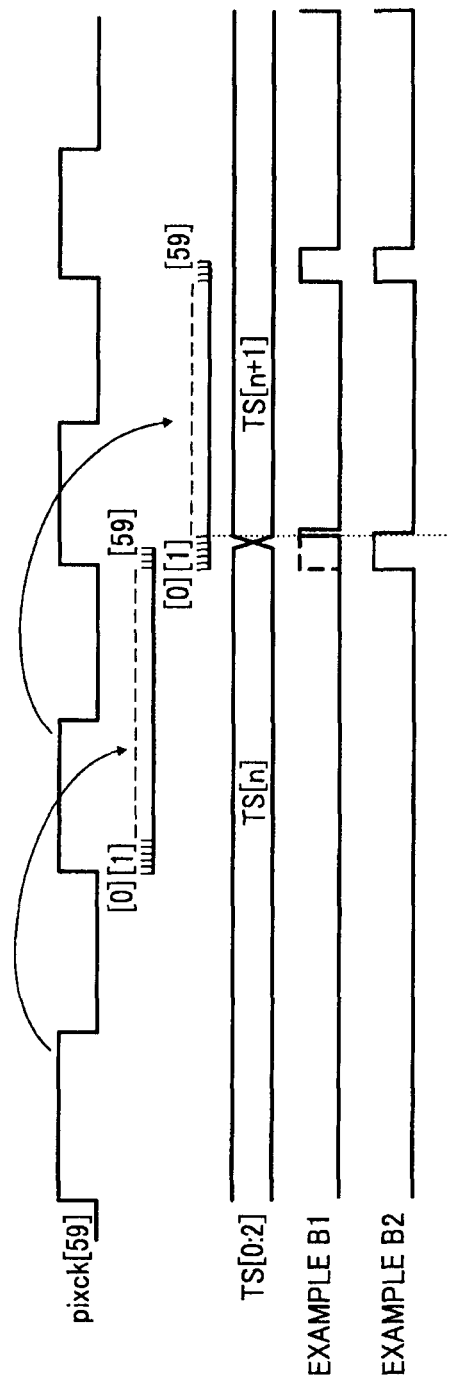

TIMING GENERATOR AND IMAGE SCANNING APPARATUS

CROSS-REFERENCE TO RELATED APPLICATIONS

The present application claims priority to and incorporates by reference the entire contents of Japanese priority document 2008-046751 filed in Japan on Feb. 27, 2008.

BACKGROUND OF THE INVENTION

1. Field of the Invention

The present invention relates to a technology for generating a timing signal to drive a line image sensor.

2. Description of the Related Art

FIG. 23 is a timing diagram of typical timing signals, or clocks, that are used to drive a charge coupled device (CCD). The timing signals required to drive the CCD include an XPH1 and an XPH2 for transferring a signal charge obtained from a photodiode using an analog shift resistor, an XRS that resets a floating capacitor of a source follower with respect to each pixel, where the source follower converts the transferred signal charge into voltage and outputs the voltage from the CCD, an XCP that determines an offset level of a waveform to be output from the CCD, an XPH2L required at the last stage of transferring the charge, and an XSH that transfers the charge accumulated in the photodiode to the analog shift resistor in a period between exposure times.

These clocks are generated by a timing generator (TG). In the TG, a quartz oscillator produces a reference oscillations and a phase locked loop (PLL) multiplies the reference oscillations thereby adjusting the reference oscillations to have a required phase and a required pulse width. The clocks generated by the TG are passed through a driver before reaching the CCD.

Normally, the clocks including the XPH1, the XPH2, the XCP, the XRS, and the XPH2L are not constantly output. That is, these clocks are suspended for a predetermined period before or after a timing of the XSH. However, strict restrictions are set for the period of the suspension and the state of starting and ending the clock, which complicates the timing of the suspension. The restrictions vary delicately with the type of the CCD.

To cope with such restrictions, the conventional TG realizes an output of the timing signal virtually specific to each type of the CCD by making an application specific integrated circuit (ASIC) with the CCD determined at the stage of designing an apparatus (see, for example, Japanese Patent Application Laid-open No. 2006-340117). However, with the ASIC, the clock can be suspended only by masking a predetermined area of the ASIC before and after a predetermined gate signal. Therefore, if the timing specification of the CCD is changed, the TG cannot be used anymore, and a new ASIC needs to be developed.

Thus, there was a need of a timing generator that can generate a timing signal synchronized with a predetermined cycle based on a reference clock in image sensors having different timing specifications.

SUMMARY OF THE INVENTION

It is an object of the present invention to at least partially solve the problems in the conventional technology.

According to an aspect of the present invention, there is provided a timing signal generator that generates a timing signal in synchronization with a predetermined cycle based on a reference clock. The timing signal generator includes a signal dividing unit that divides the predetermined cycle into a plurality of partial periods, thereby generating a divided signal, wherein an output level can be set with respect to each partial period.

According to another aspect of the present invention, there is provided an image scanning apparatus including a timing signal generator that generates a timing signal in synchronization with a predetermined cycle based on a reference clock, the timing signal generator including a signal dividing unit that divides the predetermined cycle into a plurality of partial periods, thereby generating a divided signal, wherein an output level can be set with respect to each partial period; and a line image sensor driven by the timing signal generated by the timing signal generator.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a timing diagram of timing clocks generated by selecting a multi-layer clock including 60 phases generated by a delay locked loop (DLL) shown in FIG. 3;

FIG. 10A is a timing diagram of the timing signals when the state is switched from a clock output to an H output;

FIG. 10B is a timing diagram of the timing signals when the state is switched from an L output to the clock output;

DETAILED DESCRIPTION OF THE PREFERRED EMBODIMENTS

Exemplary embodiments of the present invention are described in detail below with reference to the accompanying drawings. The present invention is not limited to the embodiments, and various modifications can be made without departing from the scope of the invention.

Figure 1:
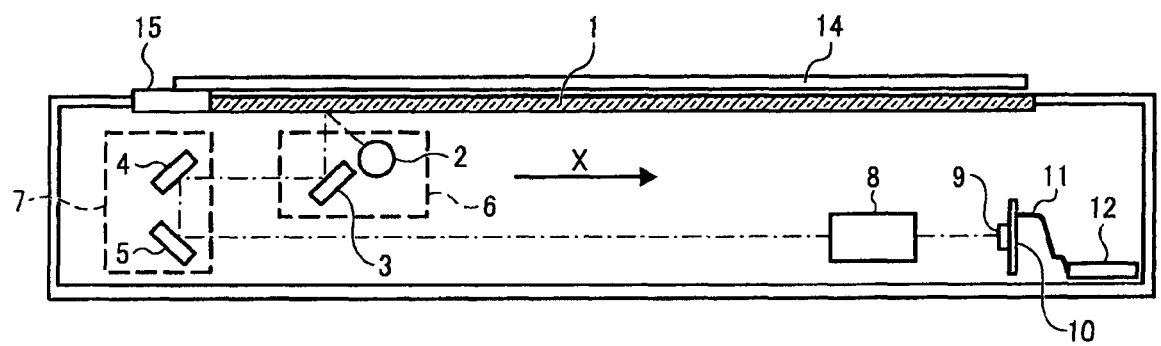
FIG. 1 is a schematic diagram of an image scanning apparatus according to a first embodiment of the present invention.

FIG. 1 is a schematic diagram of an image scanning apparatus according to a first embodiment of the present invention. The image scanning apparatus includes a platen glass 1 on which an original 14 is placed, a first carriage 6 that includes a xenon lamp 2 to expose the original and a first reflecting mirror 3, a second carriage 7 that includes a second reflecting mirror 4 and a third reflecting mirror 5, a lens unit 8, a charge coupled device linear image sensor (CCD) 9, a sensor board 10 mounted with the CCD 9, an image processing unit 12, and a white reference board 15.

To scan an image on the original 14, the first carriage 6 and the second carriage 7 are moved in a sub scanning direction X by a stepping motor (not shown). A light reflected by the original 14 is further reflected by the first reflecting mirror 3, the second reflecting mirror 4, and the third reflecting mirror 5, and then focused on the CCD 9 by the lens unit 8. The CCD 9 converts an optical image into an electrical signal, and sends the electrical signal to the image processing unit 12 via a signal line 11. The image processing unit 12 performs a digital processing such as a shading correction, i.e., a correction of varied sensitivity of the CCD 9 and an uneven light distribution by an exposure system, and a gamma correction, using image data of the light reflected by the white reference board 15 illuminated by the xenon lamp 2 with the CCD 9.

Figure 2:
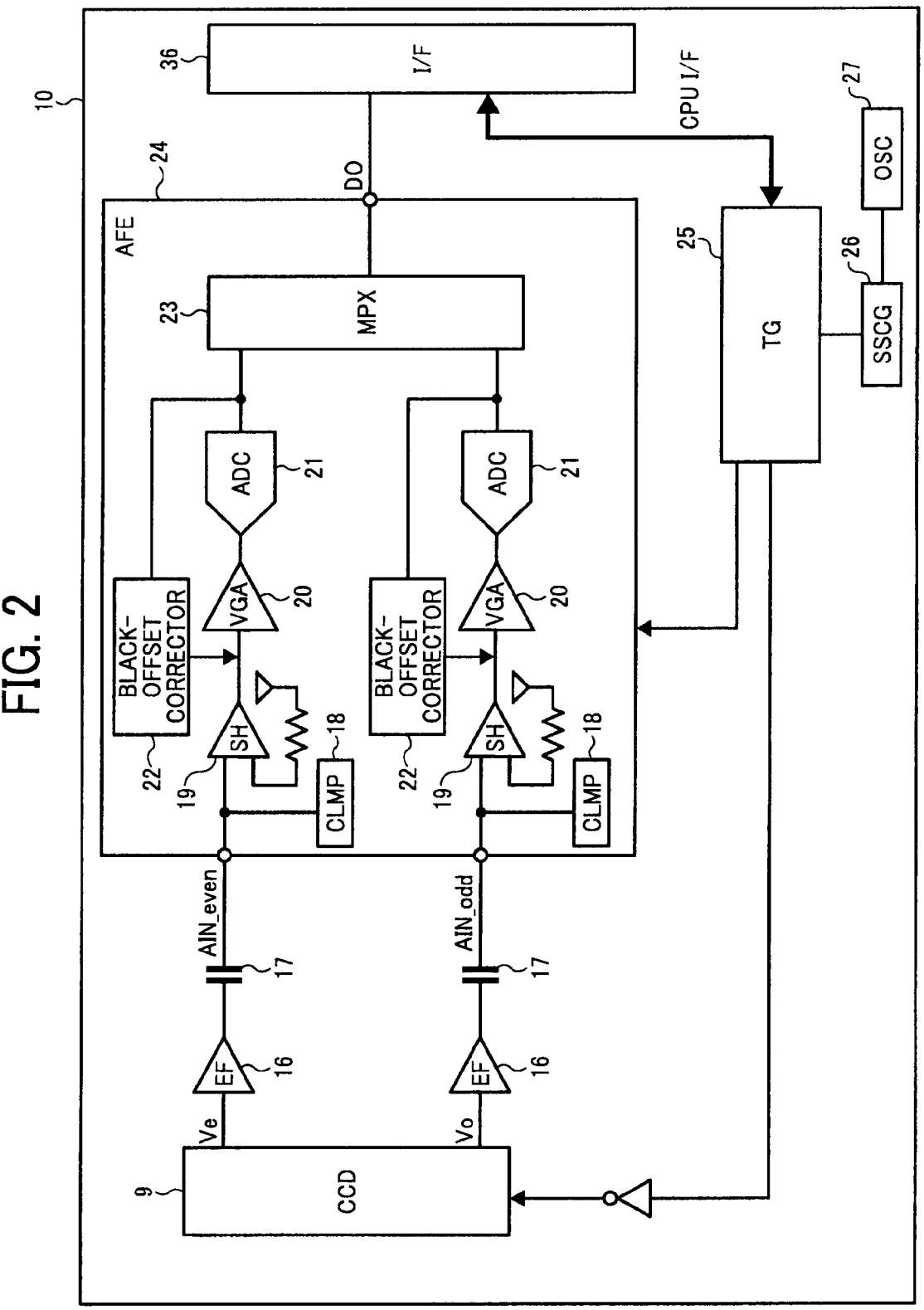
FIG. 2 is a block diagram of a sensor board including a charge coupled device (CCD), respectively shown in FIG. 1.

FIG. 2 is a block diagram of the sensor board 10. The CCD 9 outputs an image signal Ve of even-numbered pixels and an image signal Vo of odd-numbered pixels in synchronization with a driving pulse output from a timing generator (TG) 25. The image signals Ve and Vo pass through emitter followers 16 and are alternating-current (AC) coupled by capacitors 17. An offset potential after the AC coupling is direct-current (DC) restored by clampers (CLMP) 18. Sample-hold circuits (SH) 19 sample and hold the voltage level of the image signals Ve and Vo according to a timing signal received from the outside, thereby converting the image signals Ve and Vo into a continuous image signal with reduced reset noise of the CCD 9. Amplifiers (VGA) 20 amplify the image signals so that their voltage levels reach predetermined levels, and analog-digital (AD) converters (ADC) 21 convert the image signals into 10-bit digital image data.

As for the offset level of the voltage output from the CCD 9, i.e., the level of the image signal without a light, a feedback control is performed at an input end of the amplifiers 20 so that a digital output from the AD converters 21 achieves a desired offset level. In other words, a digital value of the offset level of a black reference pixel from the CCD 9 is analogized by a digital-analog (DA) circuit in a black-offset corrector 22 and fed to the input end of the amplifiers 20.

The 10-bit image data thus obtained is processed by a multiplexer 23, where the data of the odd-numbered pixels and the even-numbered pixels are synthesized, and transmitted to the image processing unit 12 via an interface unit (I/F) 36. The components from the clampers 18 to the multiplexer 23 configure an analogue front end (AFE) 24.

The timing signals required to drive the CCD 9 and the AFE 24 are generated in the TG 25. A clock output from a quartz oscillator (OSC) 27 is input to the TG 25 via a spread spectrum clock generator (SSCG) 26 that spreads the spectrum of the clock to reduce a noise by an electromagnetic interference (EMI). The timing of outputting the timing signal is adjusted based on a value of data set by an external central processing unit (CPU) to a register 32 in the TG 25 via a transmission line.

Figure 3:
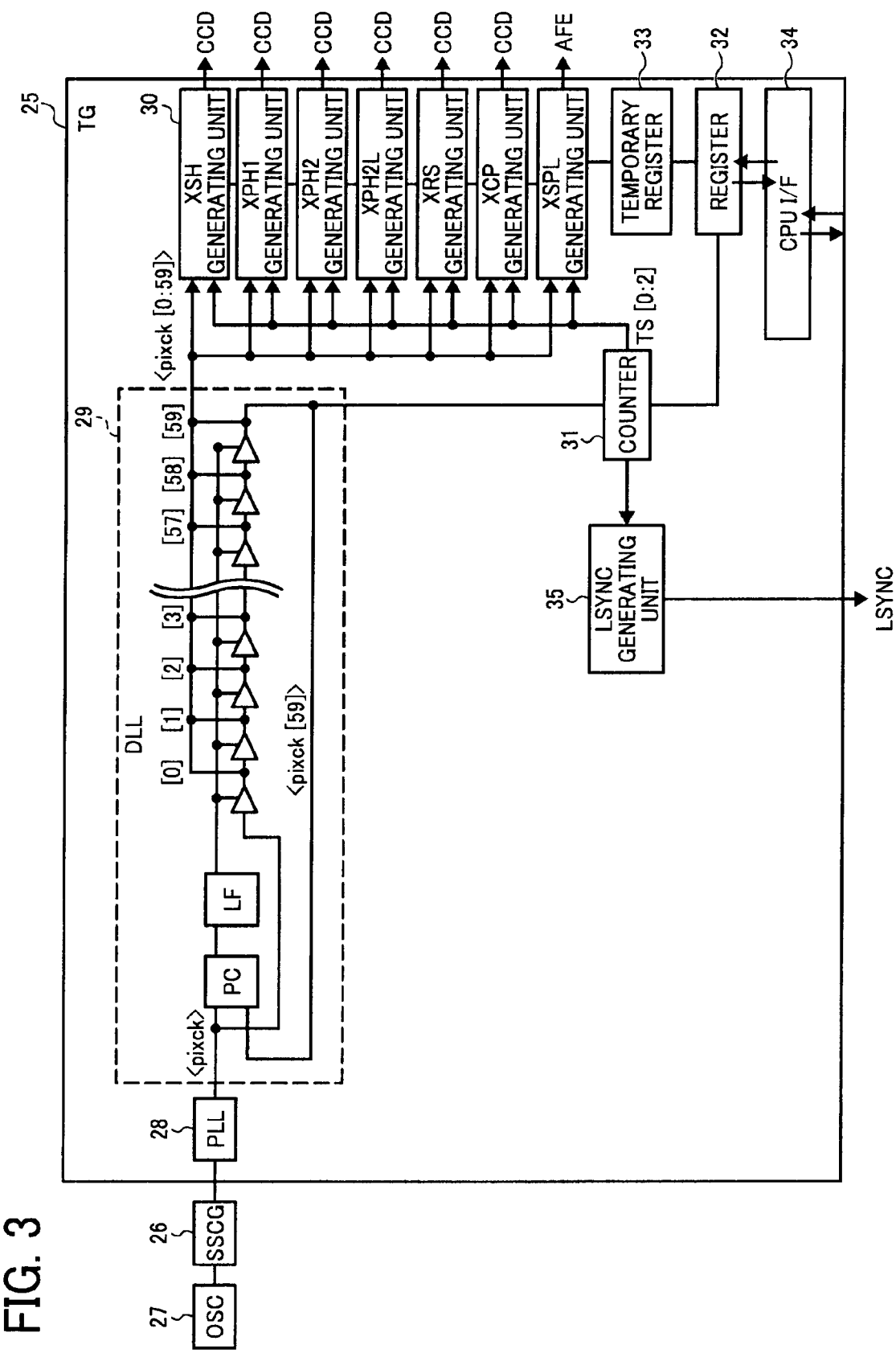
FIG. 3 is a block diagram of a timing generator (TG) shown in FIG. 2.

FIG. 3 is a block diagram of the TG 25. The clock output from the quartz oscillator 27 is multiplexed by a phase locked loop (PLL) 28 to generate pixel clocks (pixck) having the same frequency as a pixel frequency, in which each cycle indicates a pixel period. The clock is then input to a delay locked loop (DLL) 29, which generates a multi-layer clock by dividing each cycle of the pixel clock by 60. The DLL 29 includes 60 buffers ([0] to [59]) and controls the delay of each buffer by feedbacking the clocks like a PLL, comparing phases of the clocks at a phase comparator (PC), filtering an output from the PC to control the current applied to each buffer.

Various timing clocks required to drive the CCD 9 and the AFE 24 are generated by clock generating units 30 by selecting a required phase from the multi-layer clock. A method of generating the clock will be explained in detail later. Adjustment of the phase, the pulse width, and the output period of each timing clock is performed by registering them via a CPU I/F 34. At the registering, data is once written to the register 32, loaded to a temporary register 33 in synchronization with the timing of resetting a counter 31, and reflected on each clock generating unit 30.

Figure 4:
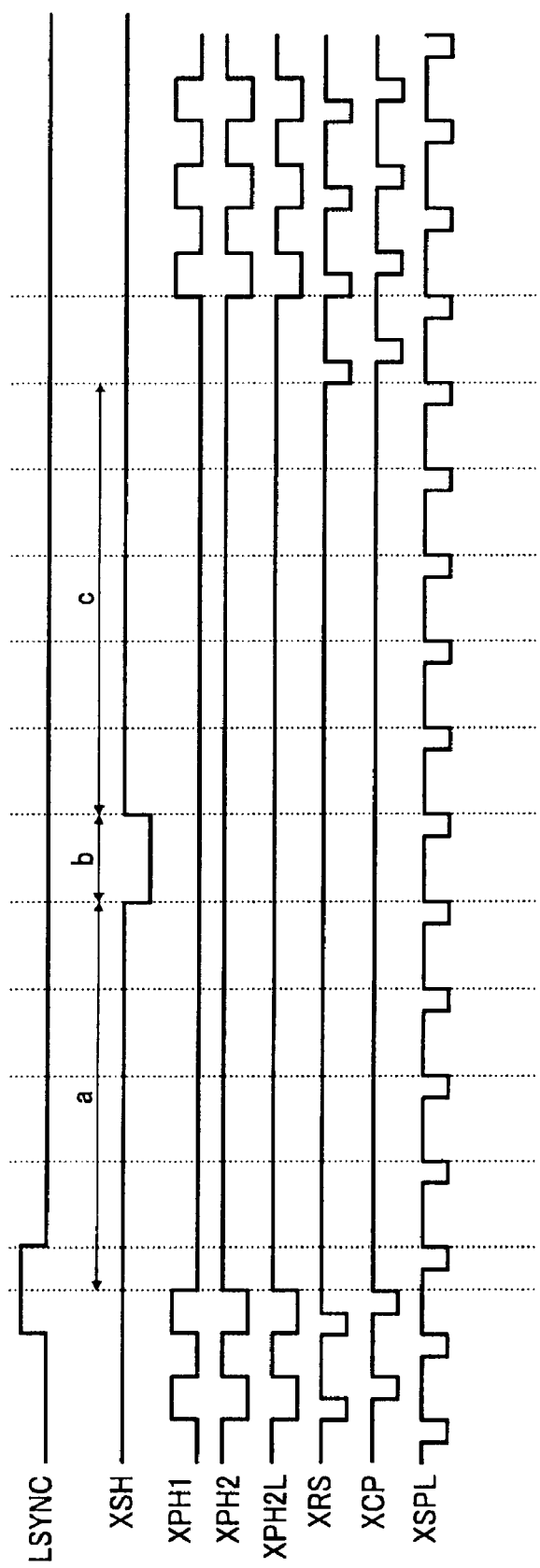
FIG. 4 is a timing diagram of typical timing signals required to drive the CCD.
Figure 23:
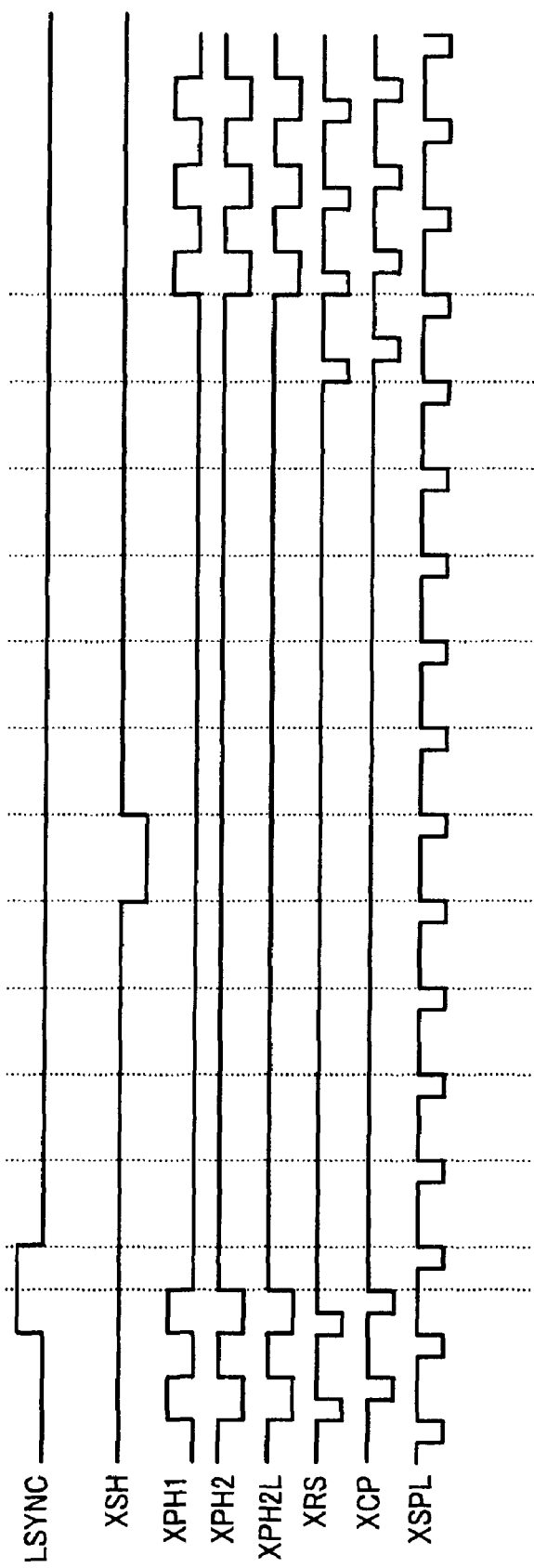
FIG. 23 is a timing diagram of typical timing signals.

FIG. 4 is a timing diagram of typical timing signals required to drive the CCD 9. To drive the CCD 9, six timing signals are required: XSH, XPH1, XPH2, XPH2L, XRS, and XCP. Functions of these signals are explained in the background of the invention section with reference to FIG. 23. An XSPL is a clock that determines the timing signal for sampling and holding in the AFE 24. An LSYNC is a line synchronization signal that determines a single-line period of main scanning.

The timing signals XPH1, XPH2, XPH2L, XRS, and XCP are clocks that are constantly output during an effective pixel period of the CCD 9. However, it is required to suspend these clocks before and after the XSH signal that determines the timing of transferring a charge accumulated in the photodiode to the analog shift resistor. As for the period of the suspension, there are restrictions on the timing for a period a after the clock stops until the XSH signal is asserted, a period b of asserting the XSH signal, and a period c after the XSH signal is negated until the clock resumes. Furthermore, there are also restrictions on a logic state during suspension of the clock and phases when the clock stops and resumes. On the other hand, the clock XSPL supplied to the sample-hold circuit 19 in the AFE 24 is constantly output regardless of the state of the CCD 9.

To realize the appropriate timings, a state switching function of the TG 25 is used. The state switching function is realized by inputting the sixtieth clock pixck[59] of the multi-layer clock generated by the DLL 29 to the counter 31 when a single main scanning line is divided into a plurality of states, i.e., periods, and switching the state to the next state when the value of the counter reaches the length of the state indicated by the number of clocks set to the register 32 of the TG 25 in advance.

Figure 5:
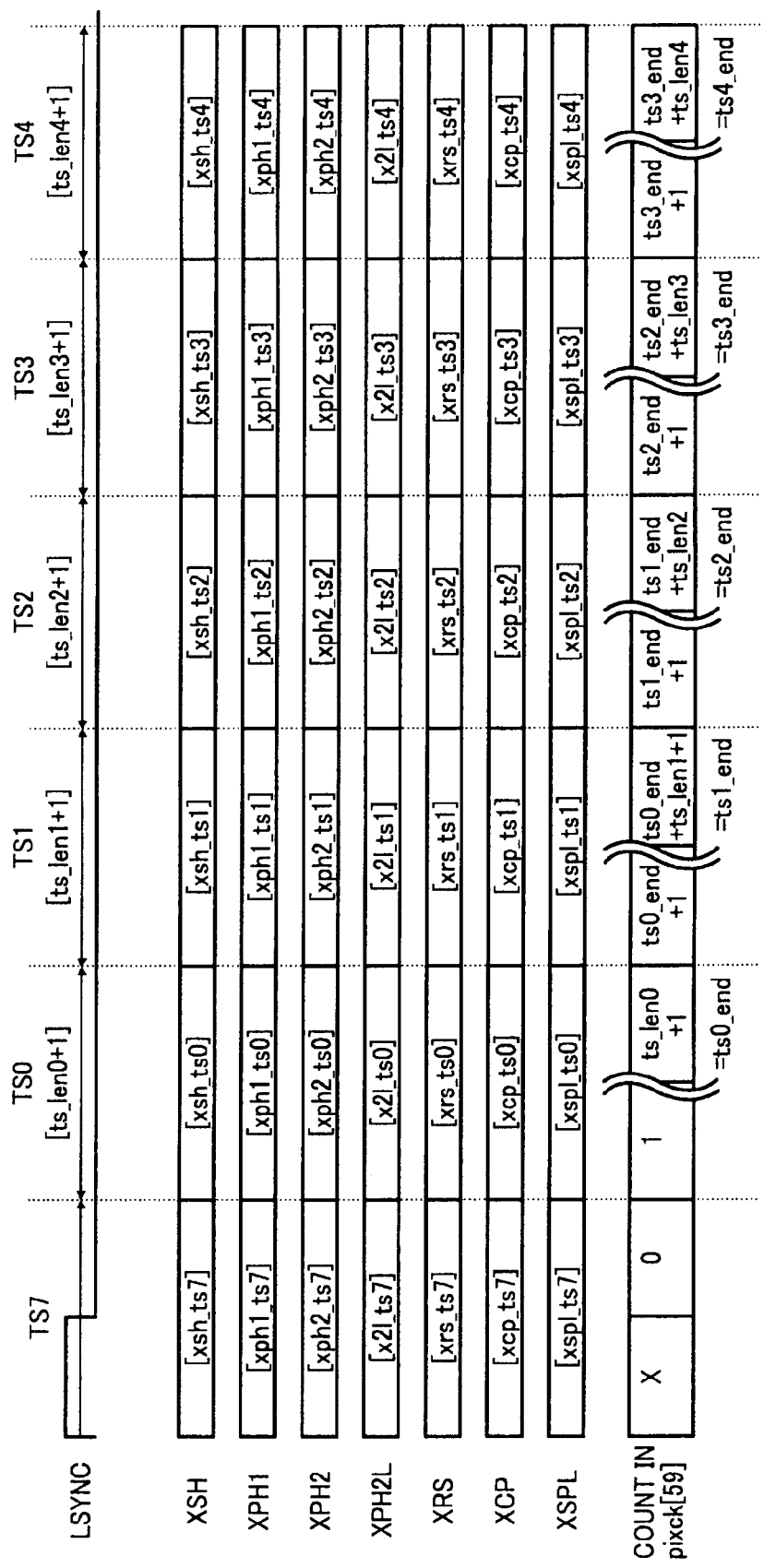
FIG. 5 is a timing diagram of timing signals generated by a state switching function of the TG in a first half of a single main scanning line.
Figure 6:
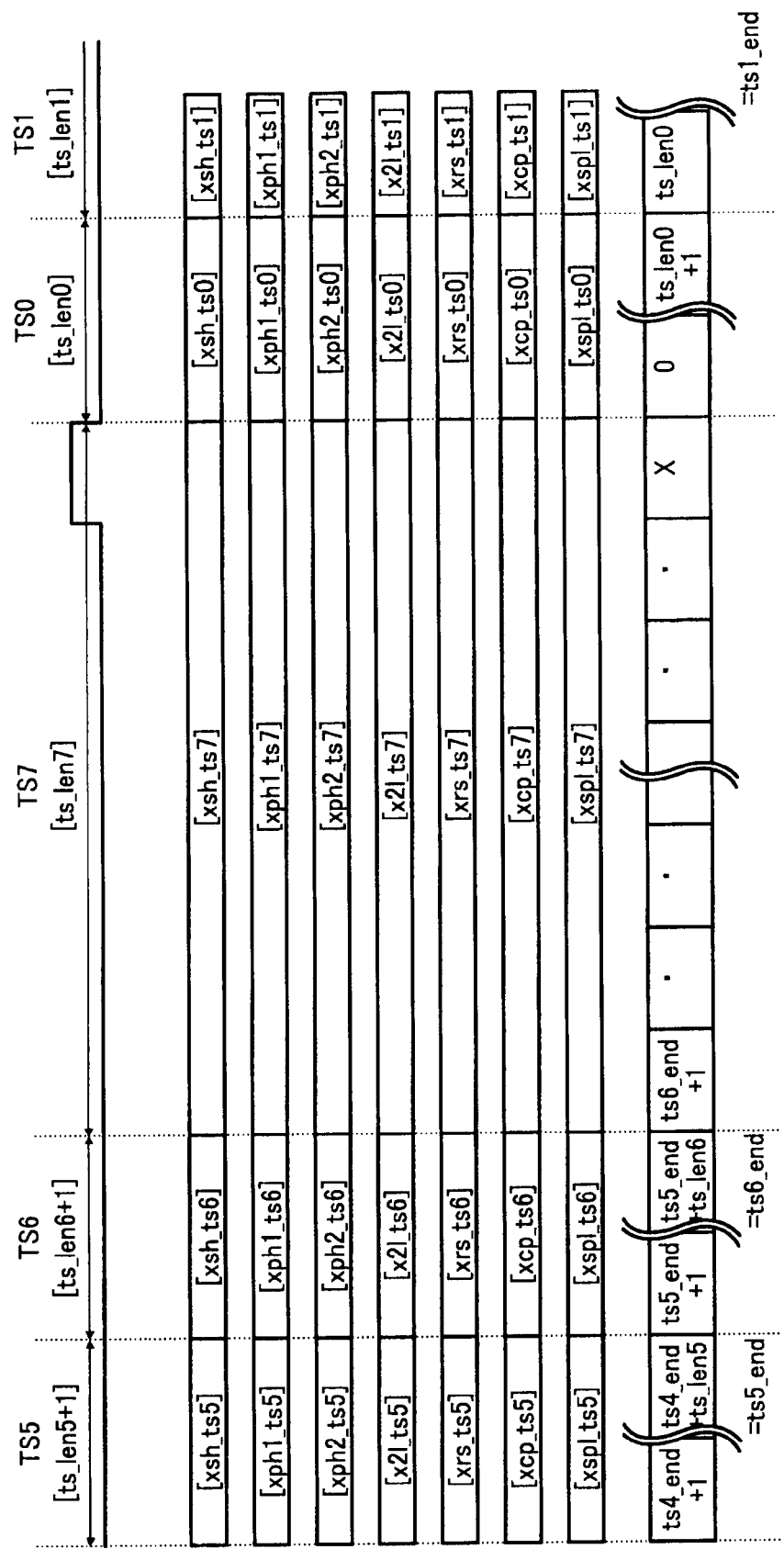
FIG. 6 is a timing diagram of the timing signals generated by the state switching function of the TG in a last half of the single main scanning line.

After the counter 31 counts the number of the clock for the length of the single main scanning line registered in advance, an LSYNC generating unit 35 outputs the LSYNC signal. At this time, the length of the main scanning line is equal to a sum of counts of TS[0] to TS[7] to be described later. The signal indicative of the present state is TS[0:2] obtained by counting the pixck[59] with the counter 31. In other words, the state is switched to one of eight states for a single scanning line. A timing diagram of the timing signals in the single main scanning line is shown in FIGS. 5 and 6. After asserting the LSYNC, the state starts from TS[0], and it becomes TS[1] when the count reaches a predetermined clock count. The state advances in this manner, and when the counter counts the predetermined clock count of the last state TS[7], the counter 31 is reset returning the state to TS[0]. In each of the states, a register [*_ts*] in the TG 25 can set the timing signal to be output at the clock level, the H level, or the L level.

Figure 7:
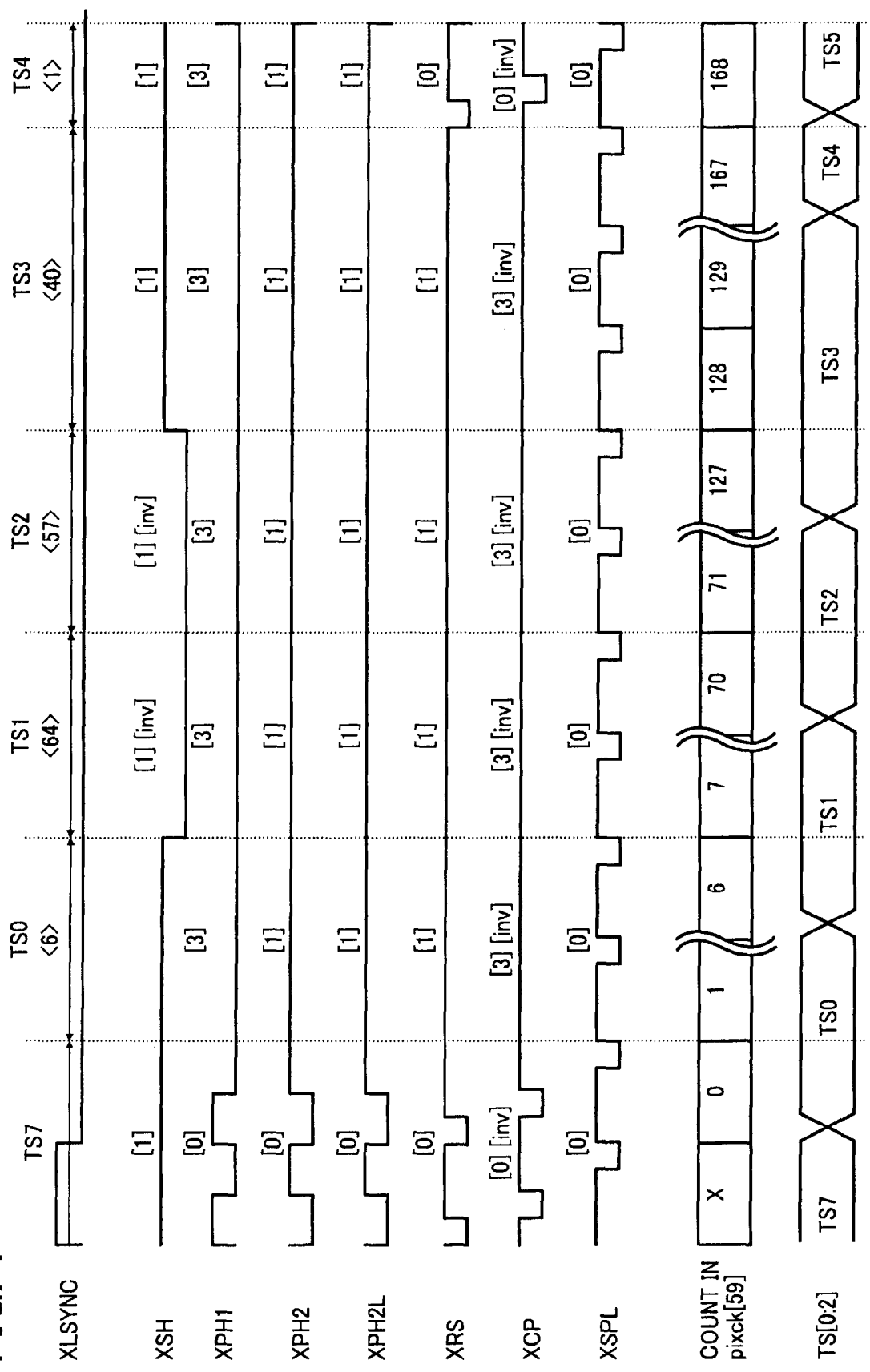
FIG. 7 is an example of the timing diagram of the timing signals generated by the state switching function of the TG in the first half of the single main scanning line.
Figure 8:
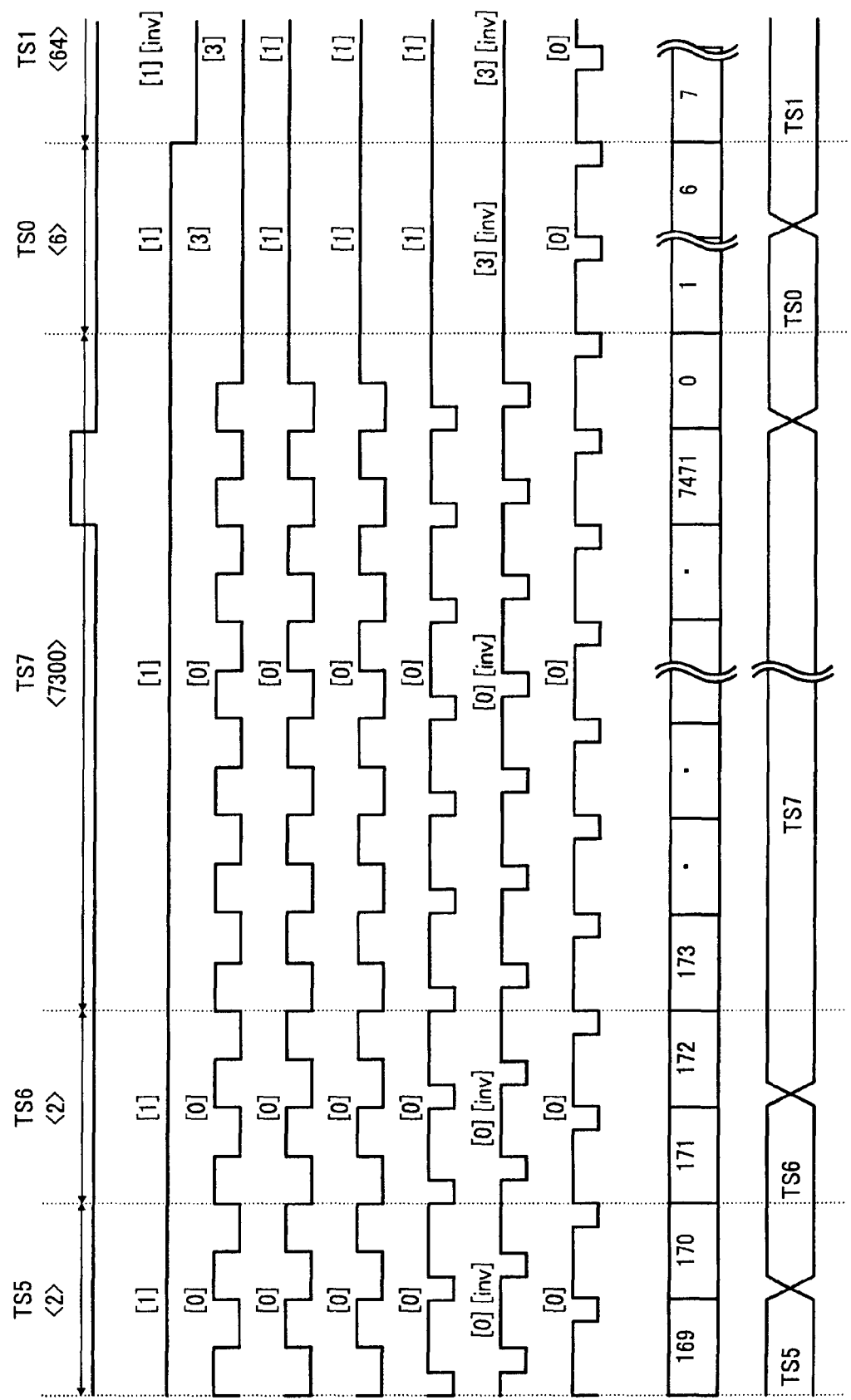
FIG. 8 is an example of the timing diagram of the timing signals generated by the state switching function of the TG in the last half of the single main scanning line.

FIGS. 7 and 8 are specific examples of the timing diagrams shown in FIGS. 5 and 6. A value in a square bracket above the timing of LSYNC represents the length of each state, i.e., the count in the pixck[59], set to the register 32, and a value in a square bracket above the timing of XSH to XSPL represents the output level set to the register 32, where zero means the clock level, one means a high logical level (H level), and three means a low logical level (L level). When the signal output is switched from the clock level to the H level for a limited period like XCP in this example, an inverting function at the last stage of the clock generating unit 30 shown in FIG. 16 can be used, while setting the L level on the state. In such a case, [inv] is added after the value in the square brackets.

In the period set at the clock level in FIGS. 7 and 8, the phase and the pulse width of XPH1, XPH2, XPH2L, XRS, and XCP need to be fine-tuned so as to satisfy the timing specifications of each pixel in the CCD 9, and the phase and the pulse width of XSPL need to be fine-tuned to the timing of sampling and holding so as to satisfy the specifications of the AFE 24.

To meet these requirements, as shown in FIG. 9, among the multi-layer clocks with the duty ratio of 50%, which includes 60 phases generated by the DLL 29, the TG 25 according to the first embodiment selects a multi-layer clock corresponding to the phase of the timing of the rising edge and the falling edge of each timing clock, and generates a desired timing signal based on the selected multi-layer clock. It is possible to specify which multi-layer clock each timing block should use by setting a value to the register 32.

The TG 25 always generates the signals to be high-active in the first phase of the DLL 29. That is, the TG 25 forms a waveform in which the rising edge comes first and the falling edge follows in the first phase of the DLL 29. In a clock A shown in FIG. 9, the timing of the rising edge is a pixck[0] and the timing of the falling edge is a pixck[30]. In a clock B, the timing of the rising edge is a pixck[15] and the timing of the falling edge is the pixck[30]. On the contrary, to generate a clock so that the falling edge comes first in the first phase, the TG 25 generates a signal having a reverse phase of the desired signal, i.e. the timing signal in which the rising edge comes first, and inverses the signal using the inverting function at the last stage of the clock generating unit 30.

FIG. 10A is a timing diagram of the timing signals when the state is switched from a clock output to an H output, and FIG. 10B is a timing diagram of the timing signals when the state is switched from an L output to the clock output. As described above, the state switching is performed by counting the pixck[59] in the multi-layer clock. When the state is switched simply at the timing of the pixck[59], there is no problem with a clock having the same phase as the pixck[59] like Example A1 shown in FIG. 10A. However, in the clock having a phase delayed from the pixck[59] like Example A2, the duty ratio of the last clock before switching from a state n to a state n+1 changes, which may lead to a malfunction of the CCD 9. To prevent the malfunction, such a signal should be switched like Example A3.

Furthermore, because the pixck[59] is generated by the DLL 29 configured as shown in FIG. 3, once a delay time at each step is determined, the delay time is reflected on the following clock. As the timing of the pixck[59] is influenced by frequency dispersion by the SSCG 26, for example, as the frequency increases, which means the clock cycle decreases, the delay time generated in a clock becomes longer than an optimum delay time for the following clock, and the order of the phase of the pixck[59] and the following clock pixck[0] can be reversed. Therefore, in the case of the timing clock that includes an edge near the pixck[0], a very narrow pulse can be generated like Example B1 shown in FIG. 10B. For correct operation, the signal should be switched like Example B2.

Figure 11:
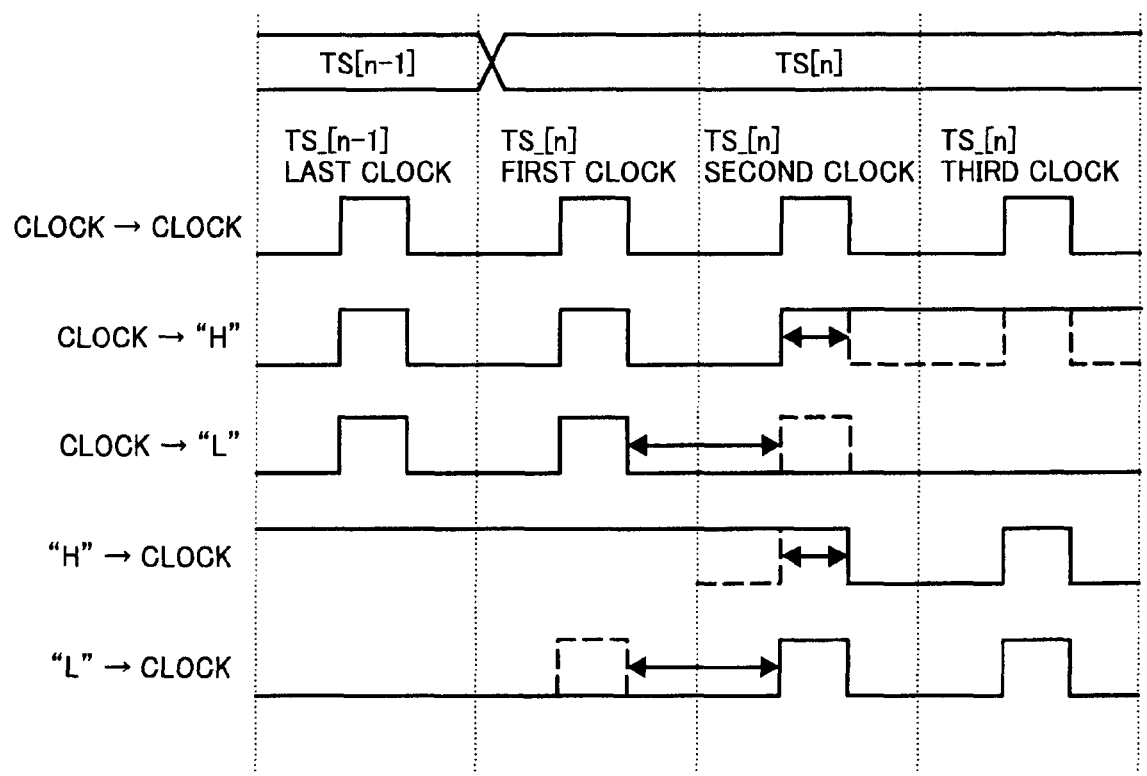
FIG. 11 is a timing diagram of the timing signals when the state is switched from the clock output to the H output and the L output and from the H output and the L output to the clock output.

In the first embodiment, when the state is switched from the clock level to one of the H level and the L level, and when the state is switched from one of the H level and the L level to the clock level, the state switching is performed at the timing shown in FIG. 11. In FIG. 11, each white two-headed arrow indicates a switching period for switching the signal level. The change of the signal level is reflected one clock behind the state switching.

More specifically, to switch the signal level from the clock level to the H level, the clock is set to switch after the rise of the second clock from the state switching instead of the rise of the first clock where the level becomes high for the first time in the state. To switch the signal level from the clock level to the L level, the clock is set to switch after the fall of the first clock instead of switching at the same time as the state switching. To switch the signal level from the H level to the clock level, the clock is set to switch after the fall of the second clock instead of the fall of the first clock from the state switching where the level becomes low for the first time in the state. To switch the signal level from the L level to the clock level, the clock is set to switch after the rise of the second clock instead of the rise of the first clock where the level becomes high for the first time in the state.

Detailed timing diagrams of the timing signals changing as shown in FIG. 11 are shown in FIGS. 12 to 15. It is assumed here that the target clock is high-active in the cycle of one pixel clock. Furthermore, the TG 25 restricts the minimum width of the H level and the L level to eight steps of delay in the DLL 29.

Figure 12:
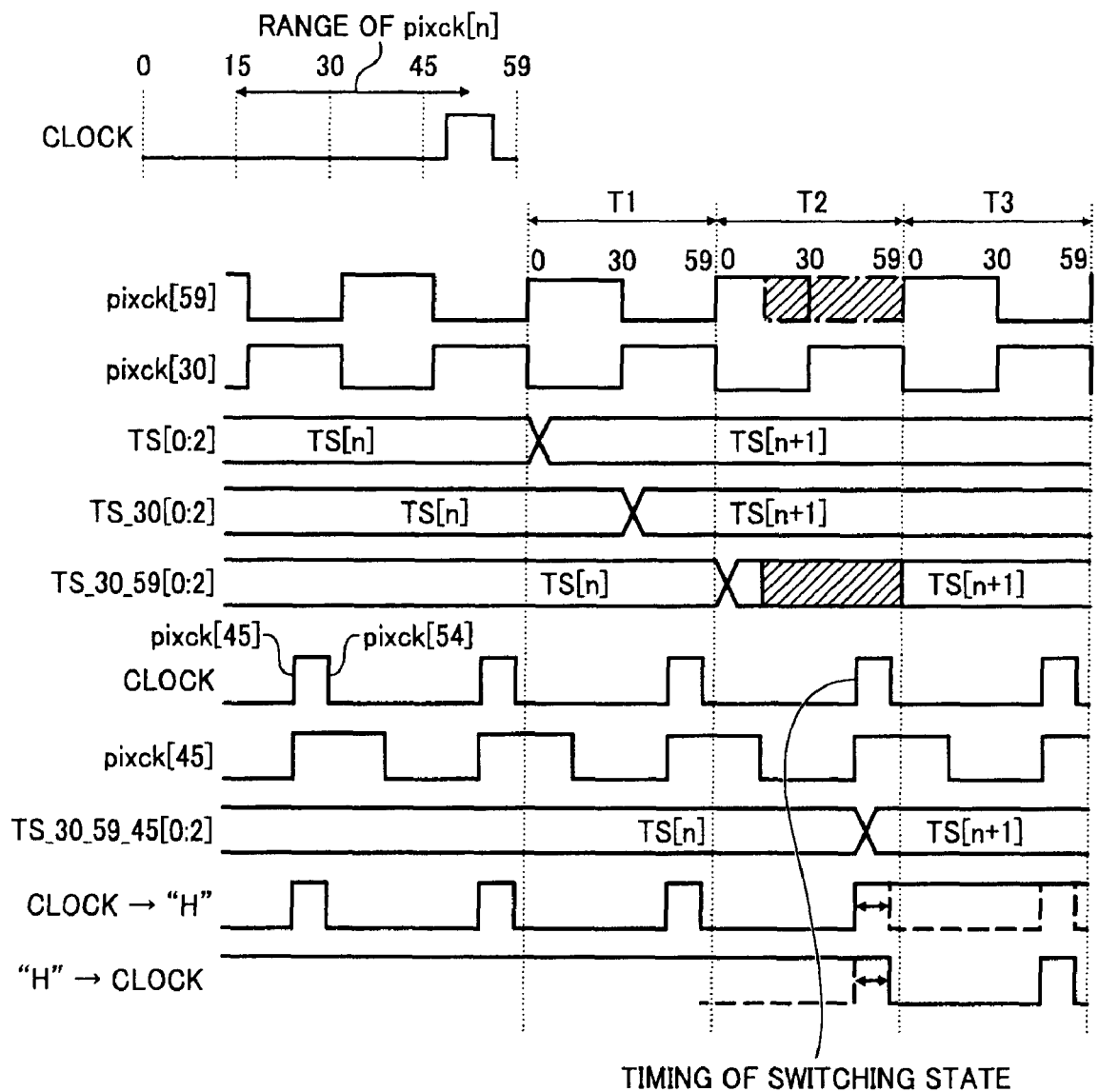
FIGS. 12 and 13 are detailed timing diagrams of the timing signals when the state is switched between the clock output and the H output.
Figure 13:
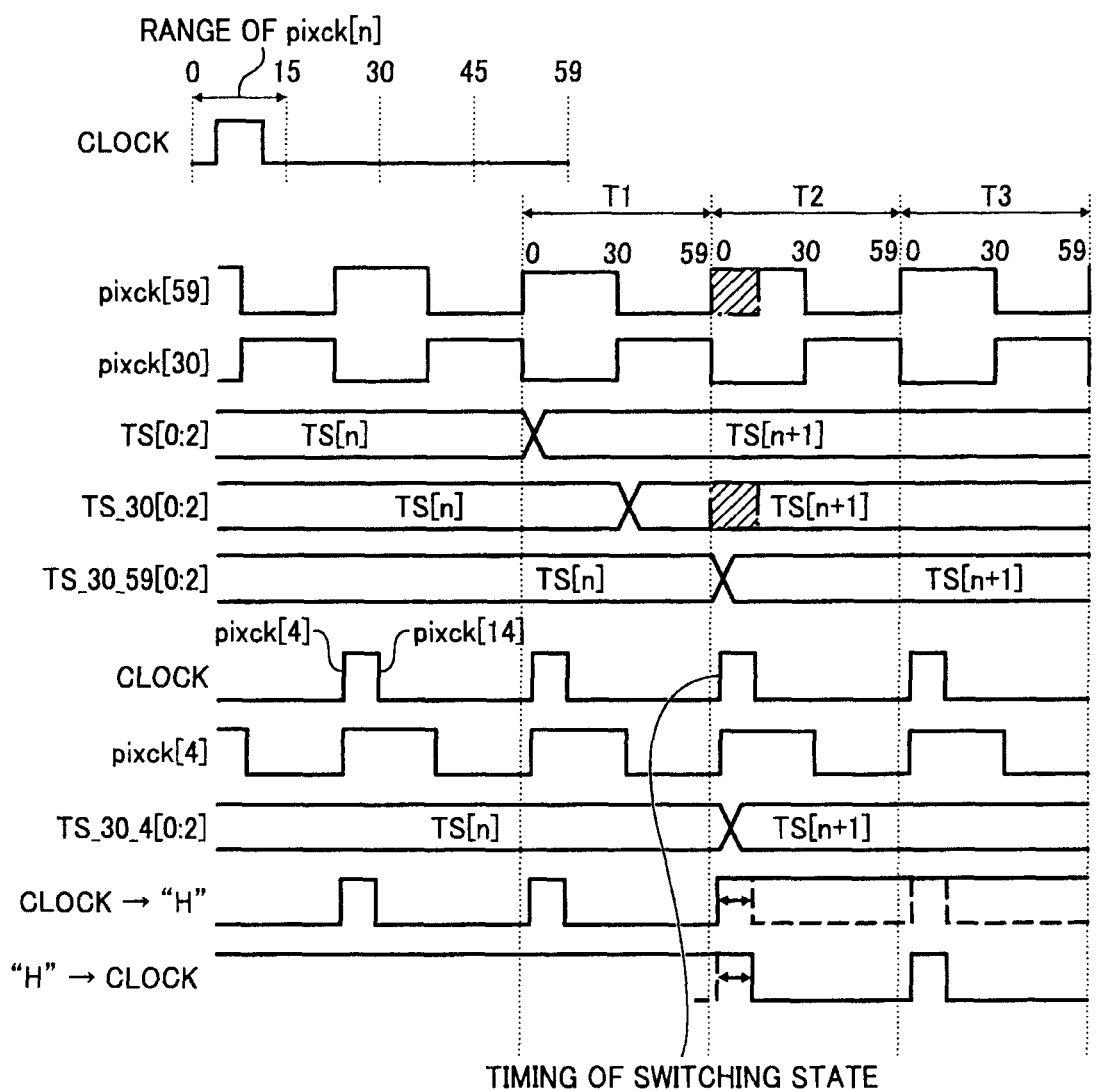

Ways of switching the state with the change of the signal level varies between the cases of switching between the clock level and the H level and switching between the clock level and the L level. In the case of switching between the clock level and the H level, the signal level is changed from the rising edge of the second clock from the switch of the state signal TS[0:2]. FIGS. 12 and 13 are the timing diagram of this case. A delay step n by the DLL 29 for a pixck[n] that forms the rising edge of the clock is 15 to 51 in FIG. 12, and it is 0 to 14 in FIG. 13. Because the minimum width at the H level is eight steps, there is no need of considering a case in which n is larger than 51. In FIGS. 12 and 13, T1, T2, and T3 are respectively the first clock, the second clock, and the third clock of TS[n+1]. Each white two-headed arrow indicates a switching period for switching the signal level, and each shadowed rectangle indicates a range of the delay step n by the DLL 29 for the pixck[n].

In both FIGS. 12 and 13, the state signal TS[0:2] indicative of the state switching is used as a trigger for the change of the signal level. However, if an edge of the target clock is near the changing point of the state signal TS[0:2], the change of the state may delay or a time for holding the data may be instable, and there is a risk that the changing point of the clock miss a desired timing by one clock.

To avoid the risk, the TG 25 uses a plurality of state signals having different phases in a single pixel clock, such as a state signal TS_$_{30}$[0:2] obtained by latching the state signal TS[0:2] with the pixck[30] and a state signal TS_30_59[0:2] obtained by latching the state signal TS_30[0:2] with the pixck[59]. In this state, the TG 25 selects one of the state signals according to the timing of the pixck[n] used to generate the rising edge of the target clock. The change of the signal level and the state is performed at the timing of latching the selected state signal with the pixck[n] used to generate the rising edge of the target clock again.

For example, in FIG. 12, the target clock is formed with the rising edge of a pixck[45] and the falling edge of a pixck[54]. The TG 25 selects the state signal TS_30_59[0:2], latches it with the pixck[45] to generate the state signal TS_30_59_45[0:2], and consequently changes the state and the signal level at the timing of latching the resulting state signal with the pixck[45] again. By doing so, the state and the signal level are switched at the rise of the clock in the period T2, and the state signal at this point is TS_30_59_45[0:2].

In FIG. 13, the target clock is formed with the rising edge of the pixck[4] and the falling edge of the pixck[14]. The TG 25 selects the state signal TS_30[0:2], latches it with the pixck[4] to generate the state signal TS_30_4[0:2], and consequently changes the state and the signal level at the timing of latching the resulting state signal with the pixck[4] again. By doing so, the state and the signal level are switched at the rise of the clock in the period T2, and the state signal at this point is TS_30_4[0:2].

To change the signal level between the clock level and the L level, the TG 25 uses a plurality of the state signals having different phases from the state signal TS[0:2], in the same manner as changing the signal level between the clock level and the H level. In this state, the TG 25 selects one of the state signals according to the timing of the pixck[n] used to generate the rising edge of the target clock. In this case, the state and the signal level are changed at the timing of switching the selected state signal.

Figure 14:
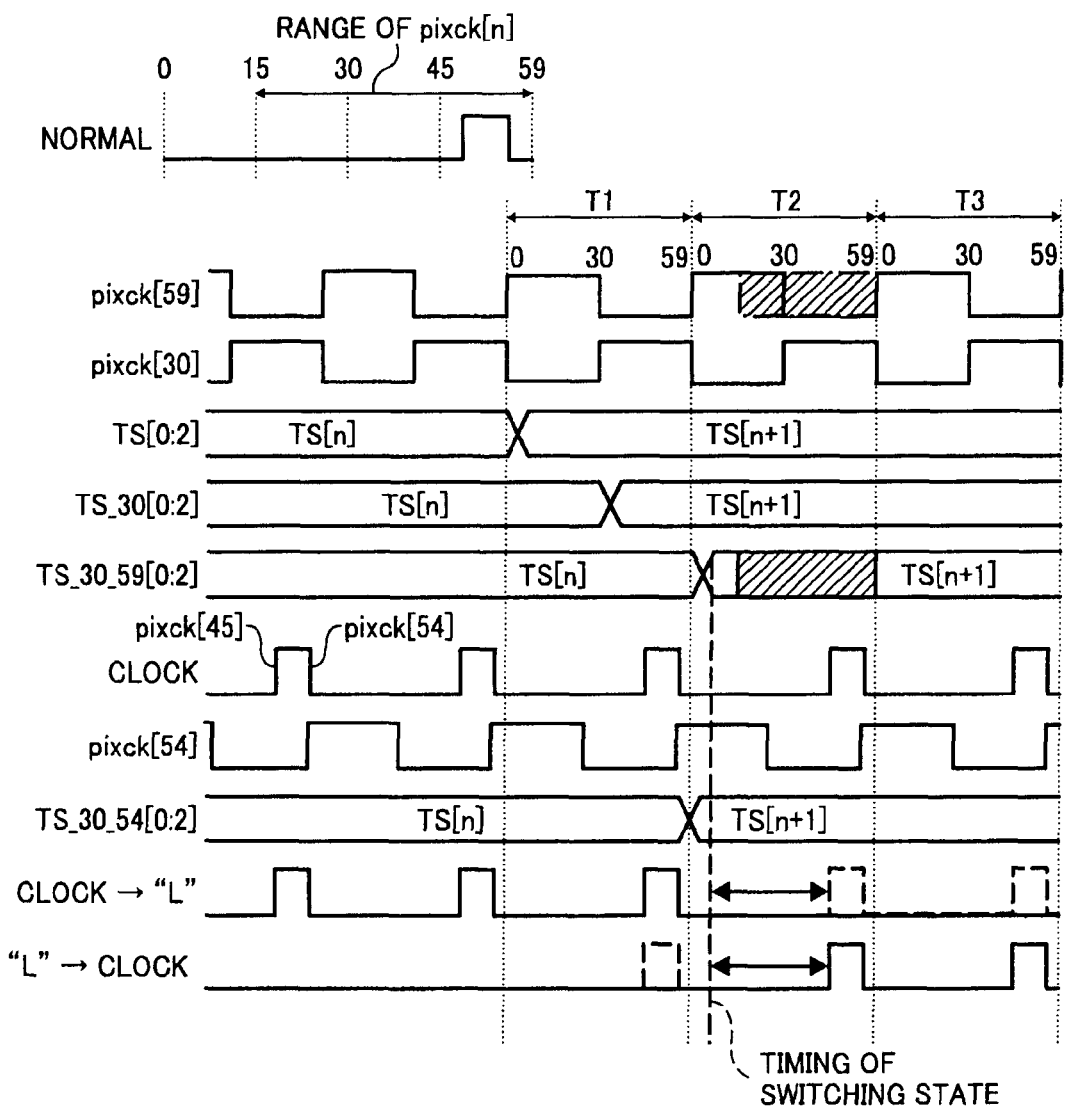
FIGS. 14 and 15 are detailed timing diagrams of the timing signals when the state is switched between the clock output and the L output.
Figure 15:
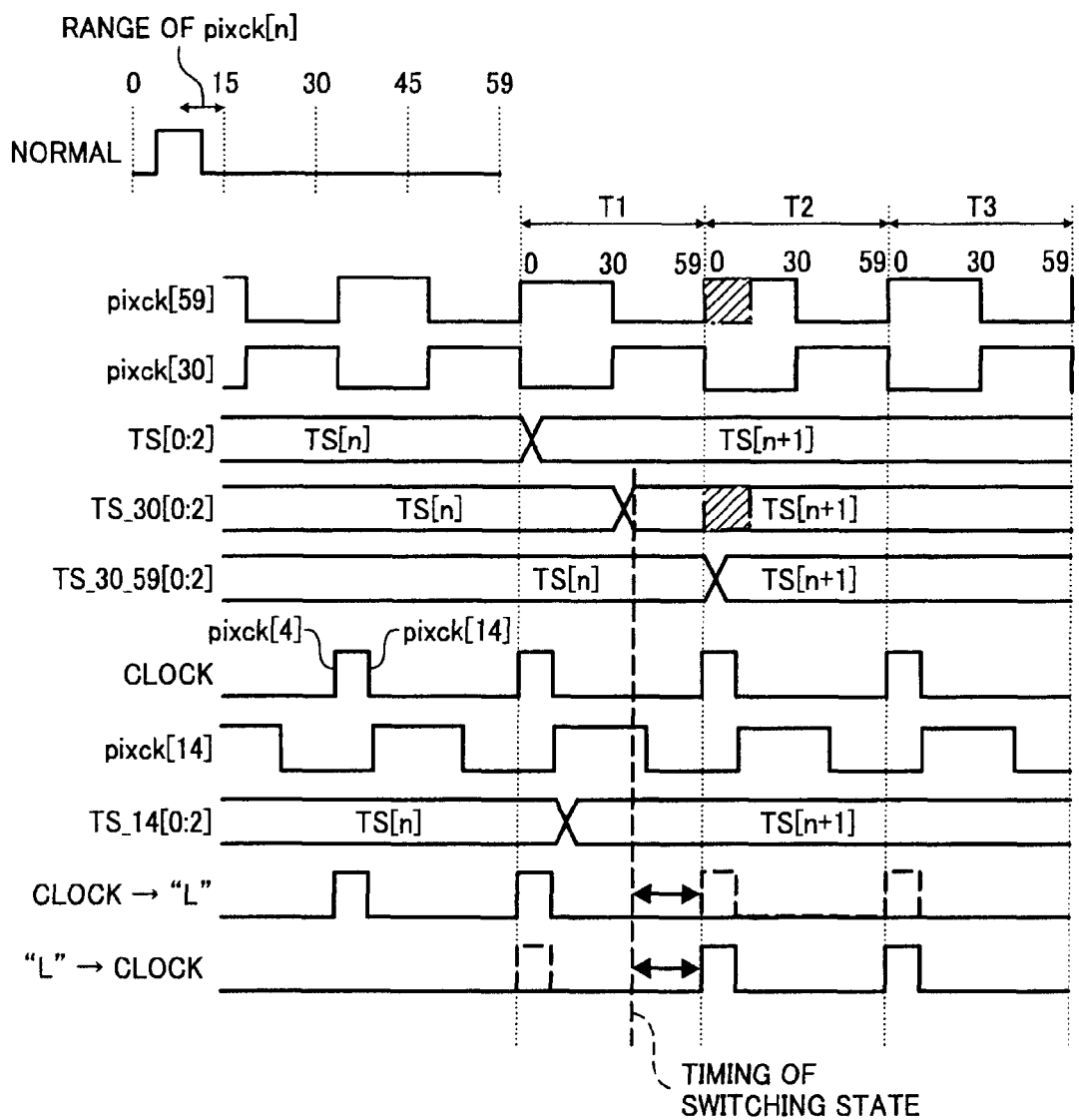

FIGS. 14 and 15 are detailed timing diagrams of the timing signals when the state is switched between the clock level and the L level. A delay step n by the DLL 29 for a pixck[n] that forms the rising edge of the clock is 15 to 59 in FIG. 14, and it is 8 to 14 in FIG. 15. Because the minimum width at the L level is eight steps, there is no need of considering a case in which n is equal to or smaller than one. In FIG. 14, the target clock is formed with the rising edge of the pixck[45] and the falling edge of the pixck[54], and in FIG. 15, the target clock is formed with the rising edge of the pixck[4] and the falling edge of the pixck[14]. In FIG. 14, the state and the signal level are switched at the timing of the state signal TS_30_59[0:2], and in FIG. 15, they are switched at the timing of the state signal TS_30[0:2].

Figure 16A:
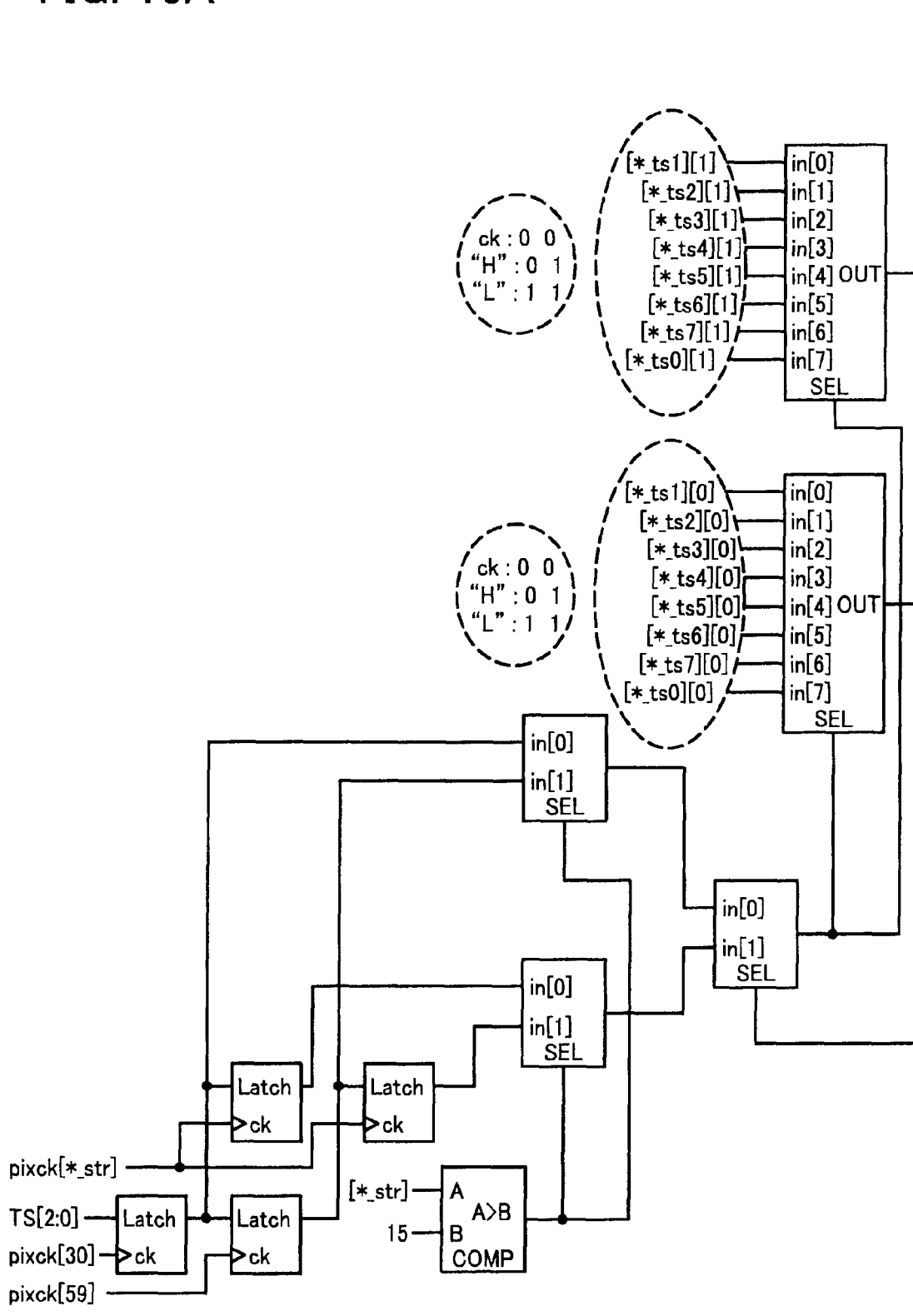
FIG. 16 is a block diagram of one of clock generators that switch the state as shown in FIGS. 12 to 15.
Figure 16B:
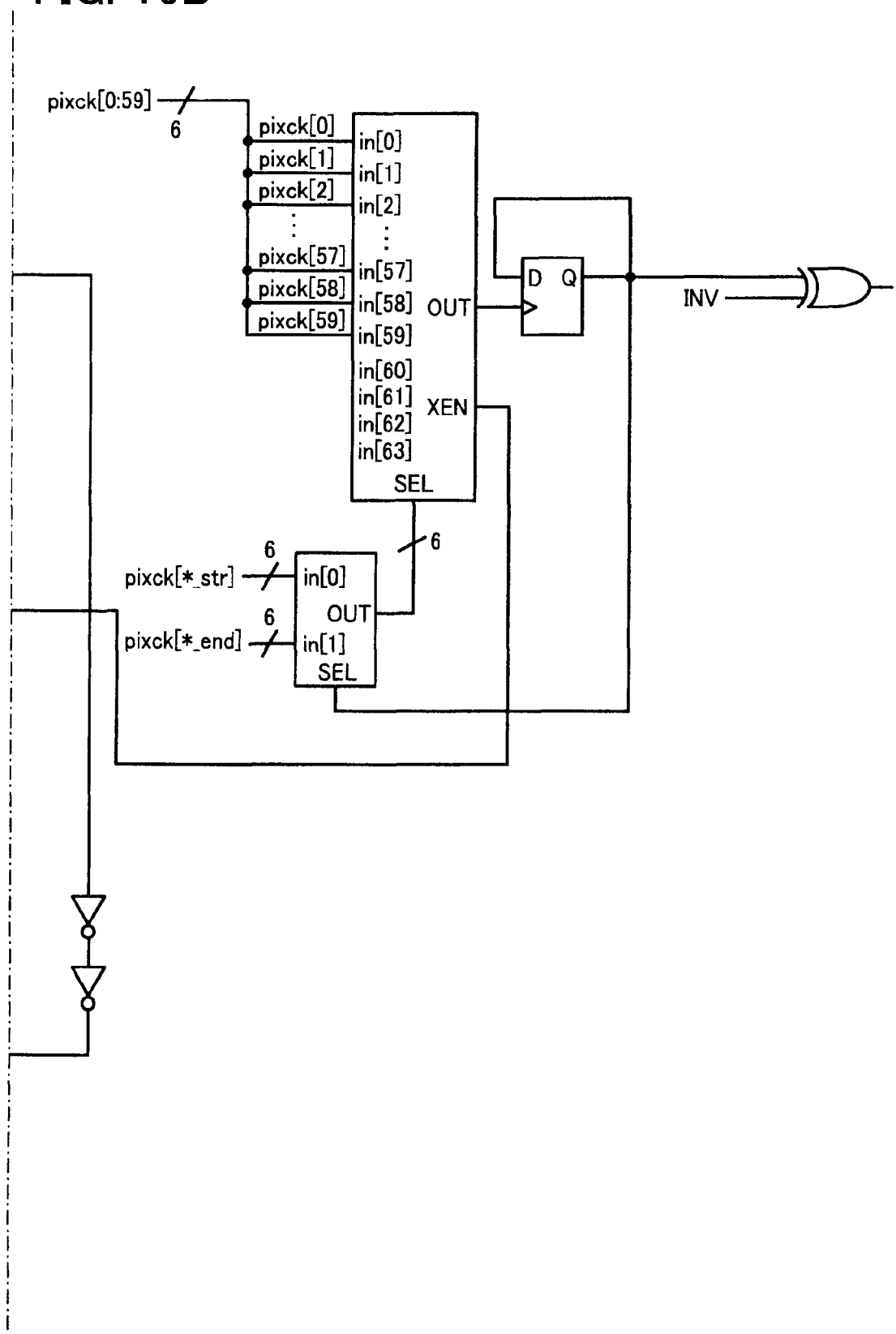

A configuration of the clock generating unit 30 that switches the timing in the above manners is shown in FIG. 16. Each symbol pixck[*_str] indicates the multi-layer clock pixck[n] that determines the rising edge of a timing signal *, and each symbol pixck[*_end] indicates the multi-layer clock pixck[n] that determines the falling edge of the timing signal *. Each symbol [*_ts(n)] is a registered value indicative of the output level of TS(n) of the timing signal *, where zero means the clock level, one means the H level, and three means the L level. At a terminal XEN in a selector to which the pixck[0:59] is input, zero means enable and one means disable, i.e., L level. At an input terminal INV of the inverter at the last stage, zero means non-inverted output and one means inverted output.

As described above, because the TG 25 according to the first embodiment can divide a period of a single main scanning line into a plurality of the states with a desired length, and the output level of each state can be set at any one of the H level, the L level, and the clock level, the TG 25 can easily generate clocks that drive CCDs having different specifications.

Furthermore, the length of the state and the output level can be arbitrarily set by writing a value in the register 32 in the TG 25. This enables controlling suspension of the clock in the single main scanning line and setting of logic during the suspension from the outside, and therefore the TG 25 can be applied to CCDs having different specifications, and the TG 25 can cope with a substantially complicated timing restriction of the CCD. The TG 25 can be also used in an image scanning apparatus having different timings of scanning.

Moreover, when the length of the state and the output level are switched by changing the set value in the register 32, the switching is performed in synchronization with the single main scanning line, thereby switching the timing without a noise in the timing signal input to the CCD 9. This prevents the malfunction of the CCD 9.

Furthermore, when the TG 25 outputs a plurality of timing signals, the length of the state and the output level can be set with respect to each signal. In this manner, because the length of the state and the output level can be set to each of gate signals and clocks, the TG 25 can drive a CCD having complicated operating specifications.

Moreover, the phase and the pulse width of the clock can be arbitrarily set by writing values in the register 32. In this manner, when the clock output is selected, because the phase and the pulse width of the clock can be controlled from the outside, the timing can be precisely set with respect to each CCD pixel.

Furthermore, the TG 25 includes the DLL 29 that controls the phase and the pulse width of the clock to be output. Because the DLL 29 can fine-tune the timing in a very short unit of time, the TG 25 is effective for driving the image scanning apparatus at a high speed.

Moreover, if the state is simply switched between the clock level and one of the H level and the L level at a single state switching timing, a clock with an undesired pulse width can be generated at the switching point, depending on the phase of the clock. Therefore, the TG 25 provides a plurality of state switching timings and selects one of the timings corresponding to the phase of the clock, thereby switching the state of the signal without causing the undesired pulse width.

Although the TG 25 according to the first embodiment is applied to the image scanning apparatus that includes a CCD, the present invention can be applied to image scanning apparatus that includes a metal-oxide semiconductor (MOS) or a contact image sensor (CIS).

Figure 17:
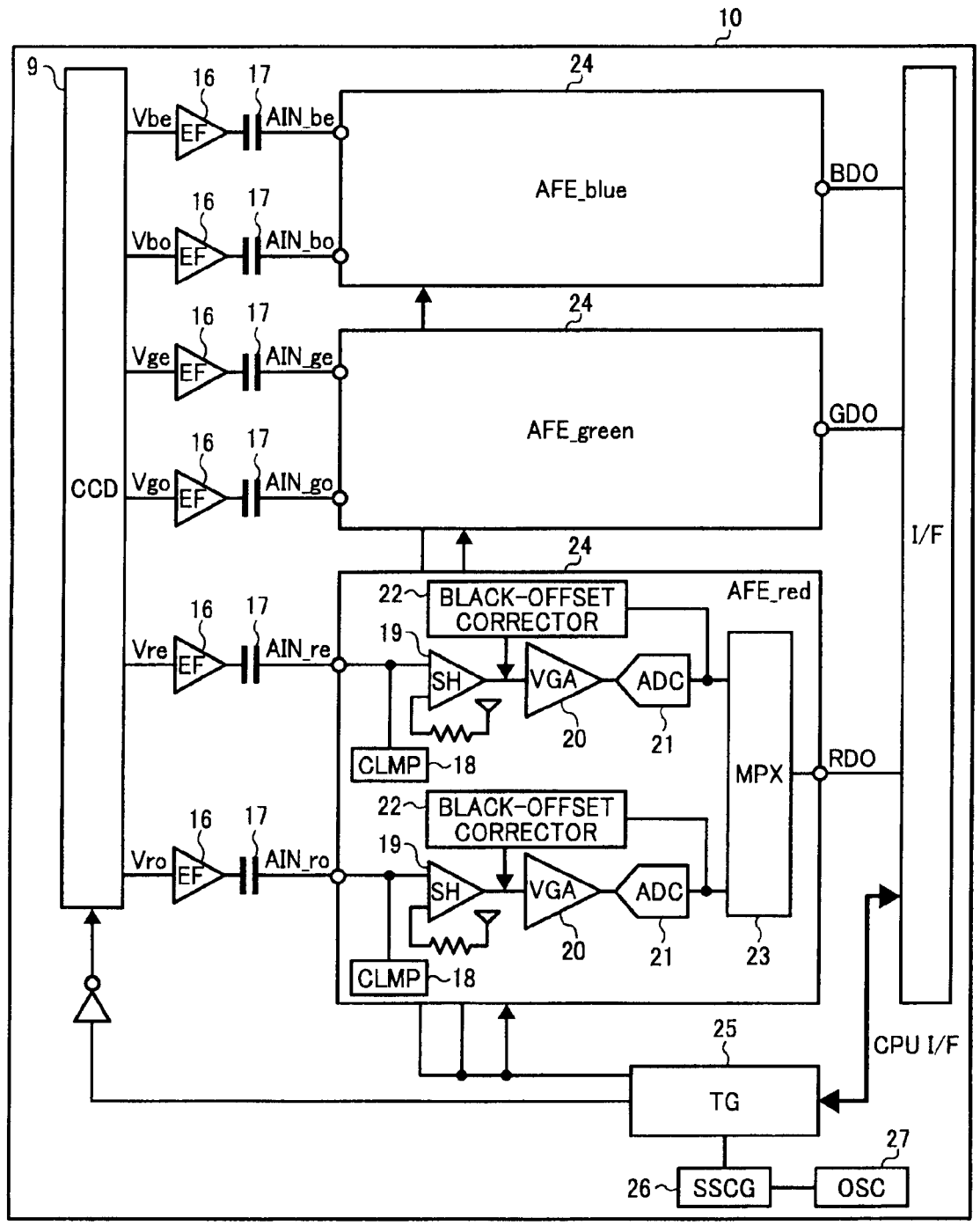
FIG. 17 is a block diagram of a sensor board including the CCD mounted to an image scanning apparatus according to a second embodiment of the present invention.

FIG. 17 is a block diagram of the sensor board 10 including the CCD 9 mounted to an image scanning apparatus according to a second embodiment of the present invention. For the same constituents shown in FIG. 2, the same reference numerals are used in FIG. 17.

In the second embodiment, the CCD 9 is a 3-line CCD sensor, with which the scanning speed is variable between color scanning and black-and-white scanning. The color scanning requires image data for each of red, green, and blue channels, which are output in parallel. On the other hand, the image data for the green channel is used for the black-and-white scanning. Because the black-and-white scanning does not need to achieve a high signal-to-noise ratio by exposing the image for as long time as the color scanning, a line scanning speed is increased.

Figure 18:
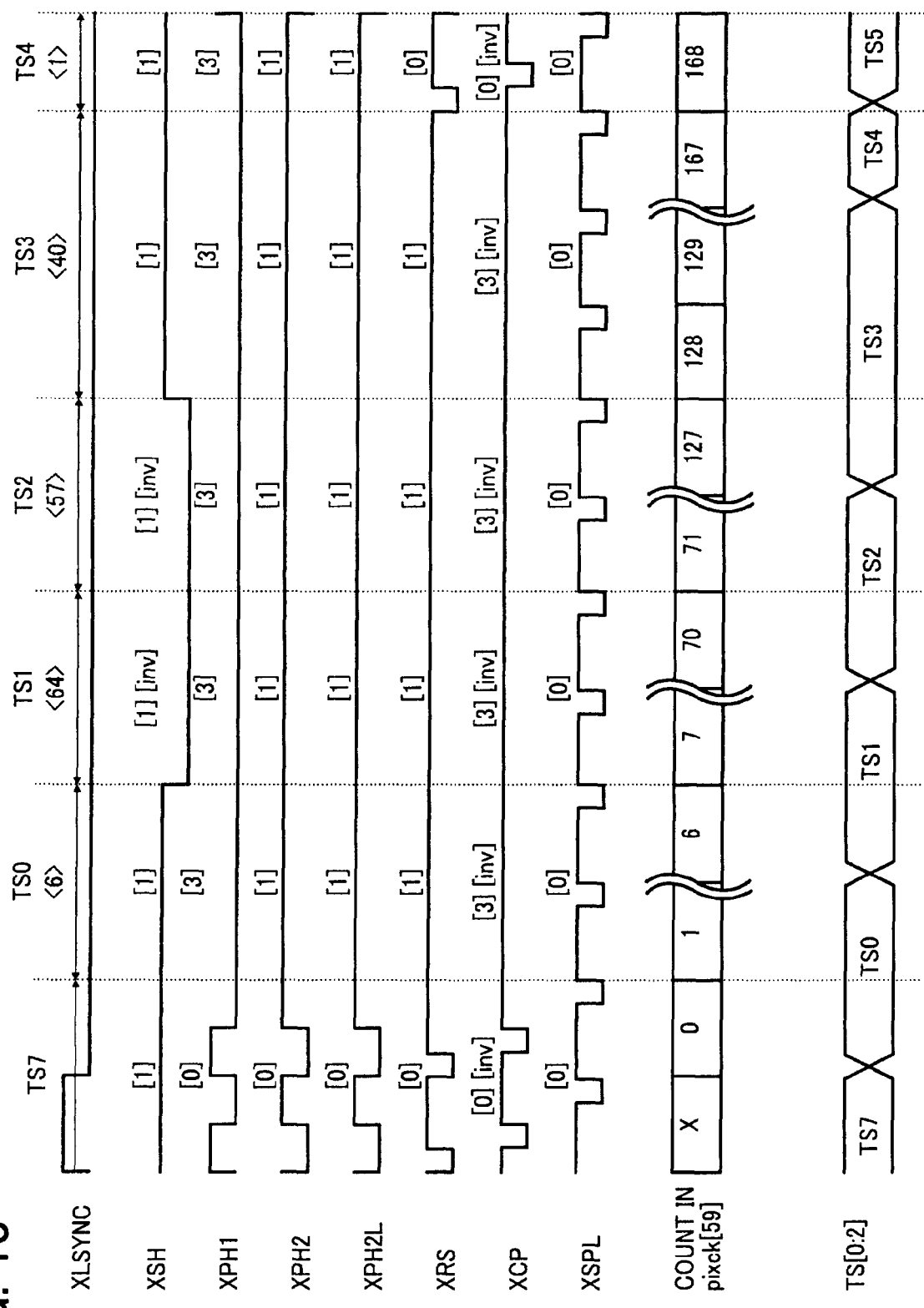
FIG. 18 is a timing diagram of the timing signals in the first half of the single main scanning line with an increased scanning speed.
Figure 19:
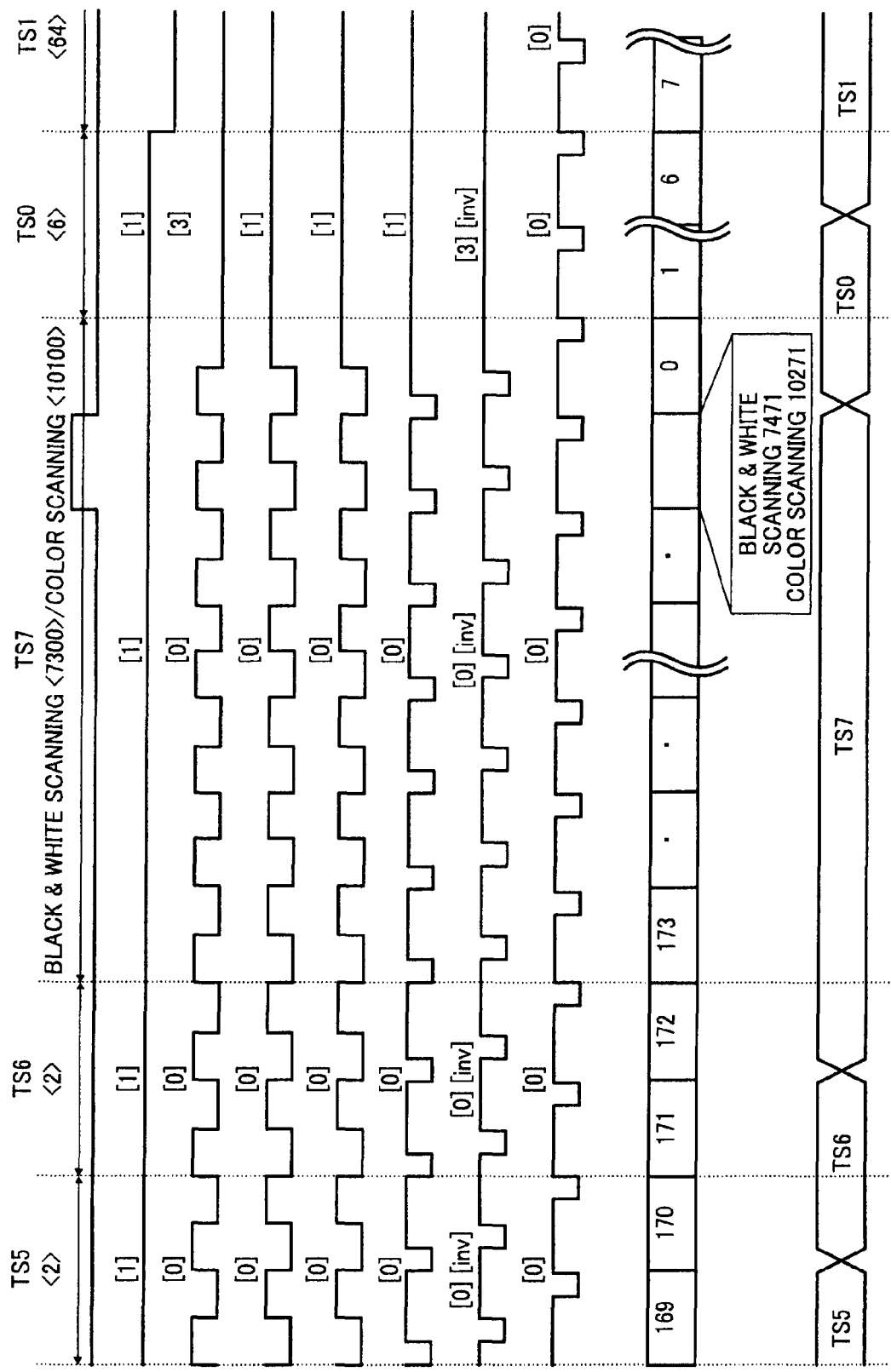
FIG. 19 is a timing diagram of the timing signals in the last half of the single main scanning line with the increased scanning speed.

FIGS. 18 and 19 are timing diagrams of the timing signals in the first half and the last half of the single main scanning line with the increased scanning speed. For the same elements as in FIGS. 7 and 8, the same symbols are used in FIGS. 18 and 19.

As shown in FIGS. 18 and 19, a single main scanning period is shortened by changing the count of the state TS[7] from 10099 for the color scanning to 7299 for the black-and-white scanning. The change in the sub scanning direction is realized by mechanically increasing the traveling speed of the first carriage 6 and the second carriage 7.

If the count of the state is changed by setting the value to the register 32 to reflect it in real time, there is a risk that the CCD 9 outputs an erroneous signal. To avoid such a risk, as in the first embodiment, the TG 25 is configured to include two registers, i.e., the register 32 and the temporary register 33. After setting the value to the register 32, the count is actually reflected in synchronization with reset of the counter.

Figure 20:
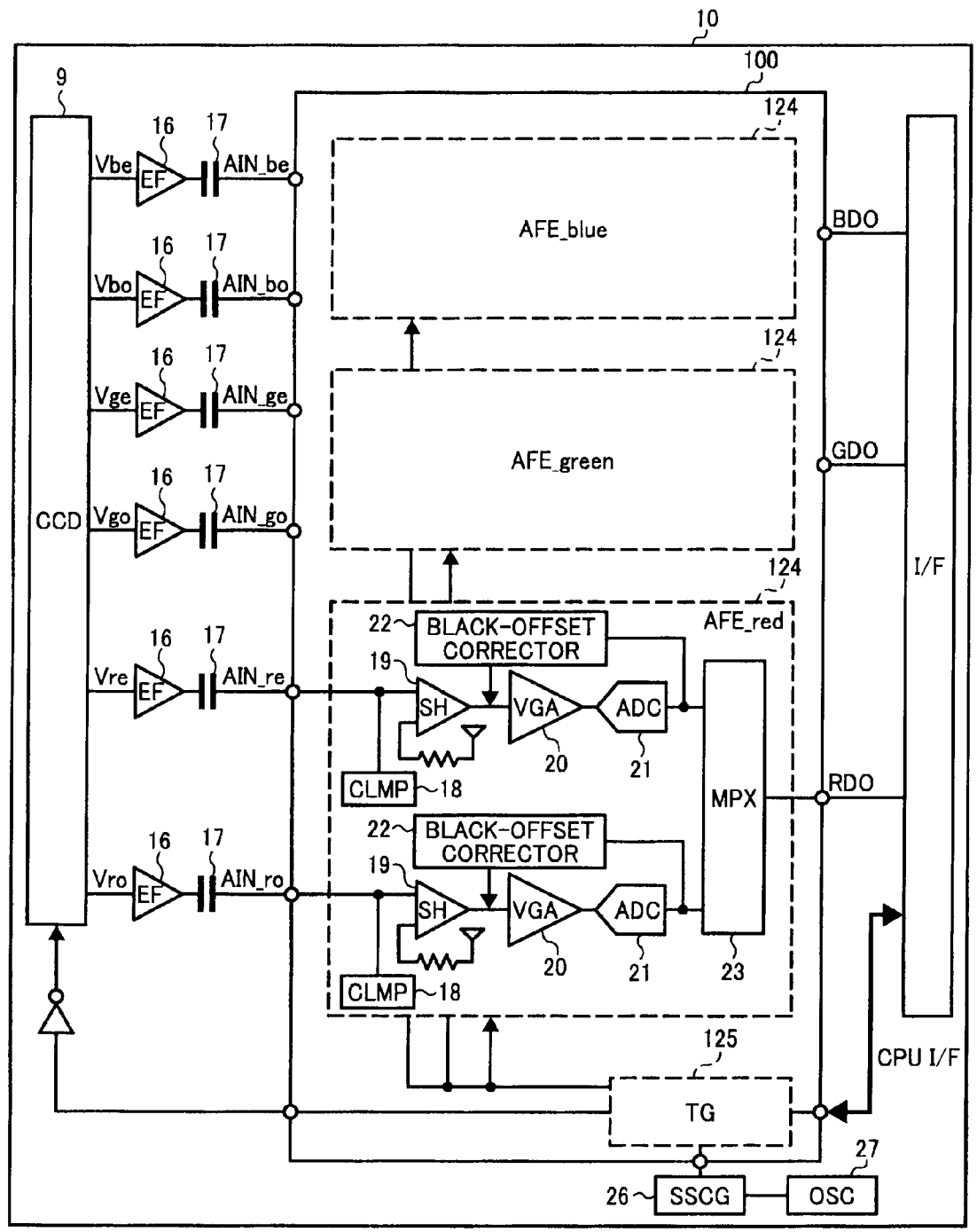
FIG. 20 is a block diagram of a sensor board including the CCD mounted to an image scanning apparatus according to a third embodiment of the present invention.

FIG. 20 is a block diagram of the sensor board 10 including the CCD 9 mounted to an image scanning apparatus according to a third embodiment of the present invention. For the same constituents shown in FIG. 2, the same reference numerals are used in FIG. 20.

According to the third embodiment, a TG 125 is integrated into an integrated circuit (IC) 100 that includes AFEs 124. In the IC 100, the timing signal for sampling and holding in each AFE 124 is transmitted from the TG 125. As in the first embodiment, the timing signal for the CCD 9 is output from the TG 125 and transferred to the CCD 9 via a CCD driver (not shown). By integrating the TG 125 and the AFEs 124 into the IC 100, the size and the production cost of the image scanning apparatus can be reduced.

Figure 21:
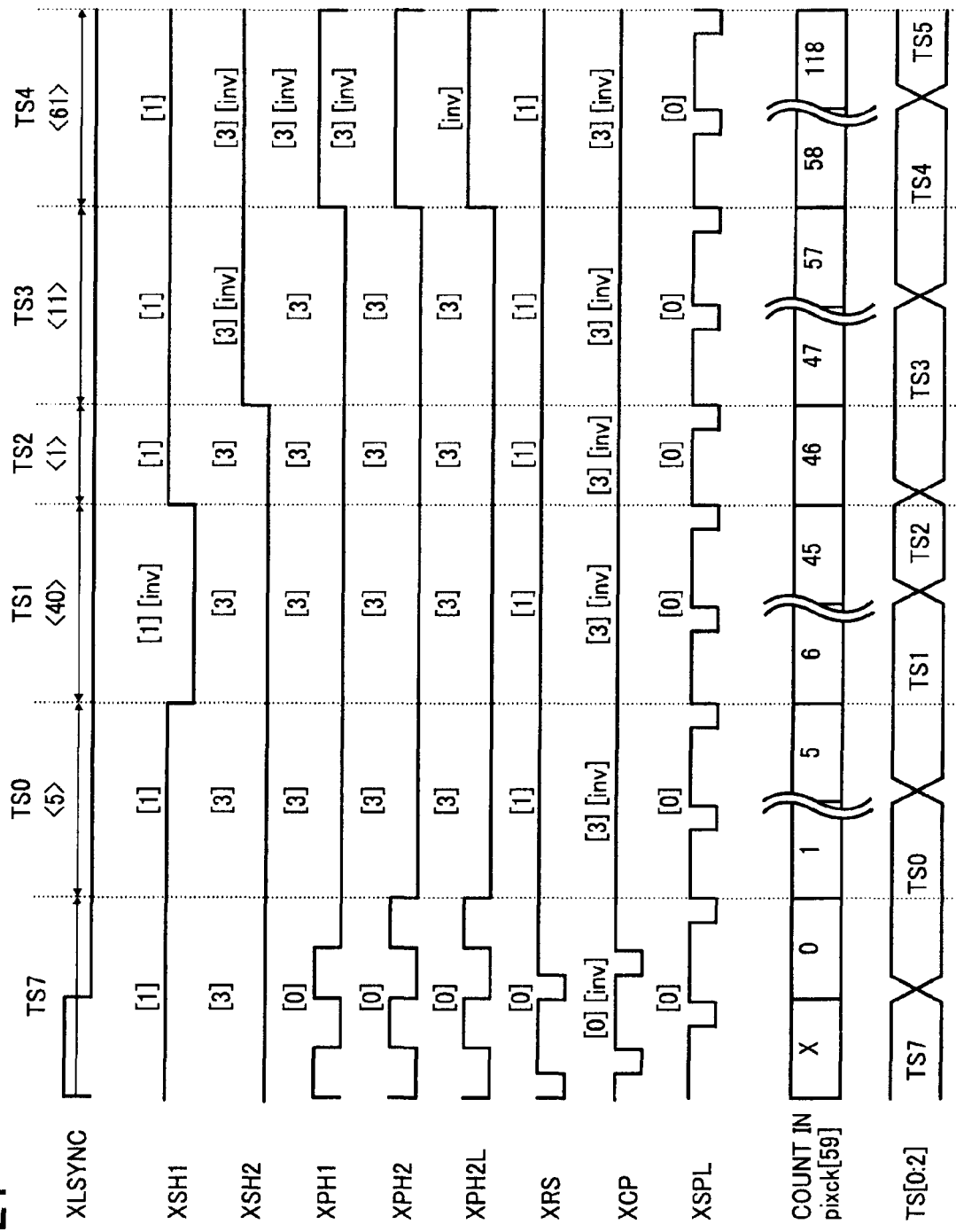
FIG. 21 is a timing diagram of the timing signals in the first half of the single main scanning line when the CCD uses a plurality of shift signals XSH for transferring a charge from a photodiode to an analog shift resistor.
Figure 22:
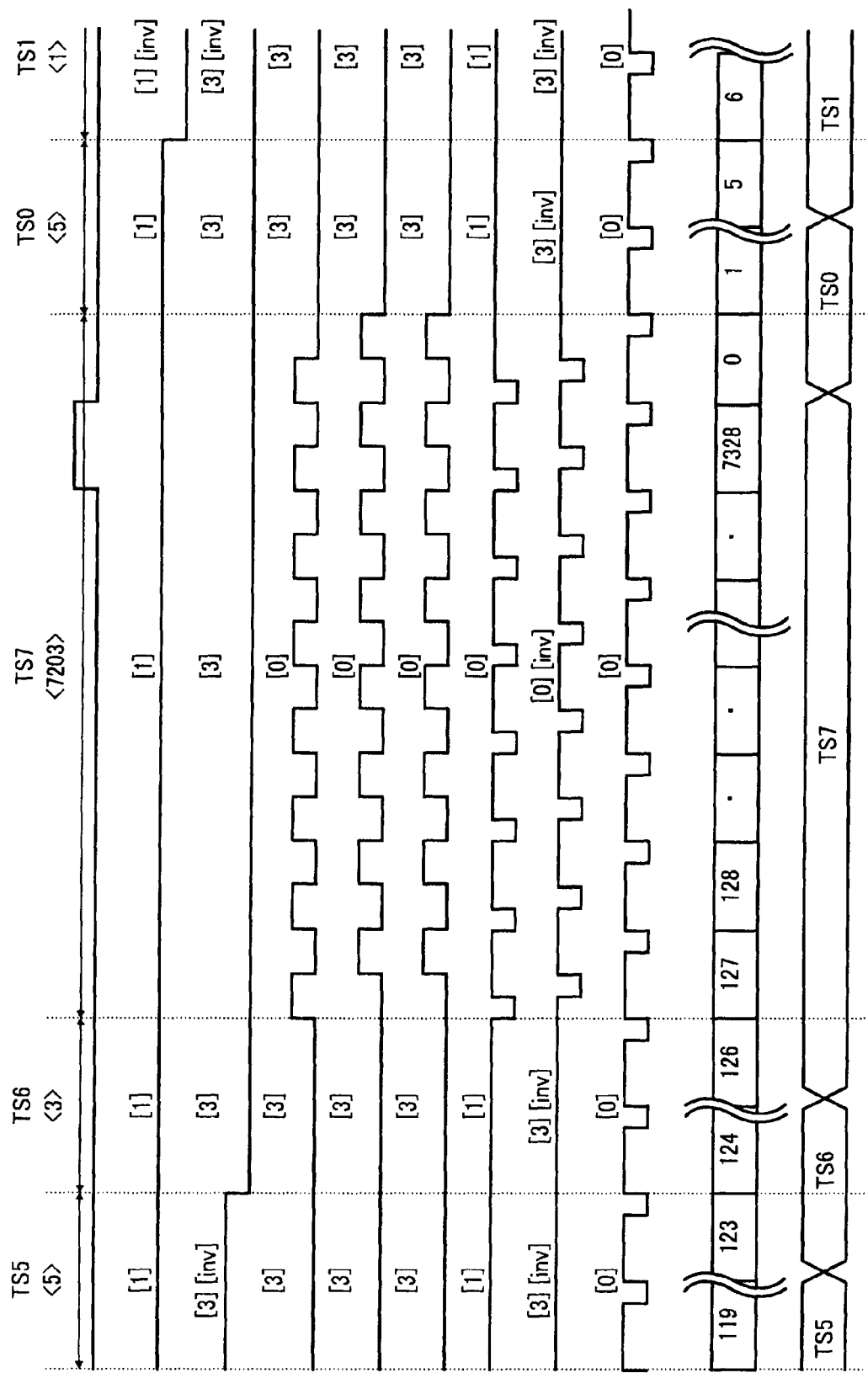
FIG. 22 is timing diagram of the timing signals in the last half of the single main scanning line when the CCD uses a plurality of the shift signals XSH.

According to a fourth embodiment of the present invention, the TG 25 is applied to a CCD that uses a plurality of the XSH signals for transferring the charge accumulated in the photodiode to the analog shift resistor. FIGS. 21 and 22 are timing diagram of the timing signals in the first half and the last half of the single main scanning line according to the fourth embodiment. For the same elements as in FIGS. 7 and 8, the same symbols are used in FIGS. 21 and 22.

According to an aspect of the present invention, it is easy to generate timing clocks that drive CCDs having different specifications.

Furthermore, the TG can be applied to the CCDs having different specifications, and it can cope with the substantially complicated timing restriction of the CCD. The TG can be also used in the image scanning apparatus having different timings of scanning.

Moreover, the TG can prevent the malfunction of the CCD.

Furthermore, the TG can drive a CCD having complicated operating specifications.

Moreover, the timing can be precisely set with respect to each CCD pixel.

Furthermore, the TG can prevent the malfunction of the CCD when the phase and the pulse width of the timing clock are changed.

Moreover, by providing a plurality of state switching timings and selecting one of the timings corresponding to the phase of the clock, the TG switches the state of the signal without causing the undesired pulse width.

Furthermore, by generating the switching timings described above using the DLL, the TG achieves a good balance between fine control of the phase and the pulse width of the timing signal and state transition without the noise in the timing signal.

Moreover, the image scanning apparatus can drive a line image sensor included therein, such as the CCD, the CIS, and the MOS sensor, even if the timing specifications of the line image sensor are substantially complicated.

Furthermore, the size and the production cost of the image scanning apparatus can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A timing signal generator that generates a timing signal in synchronization with a predetermined cycle based on a reference clock, the timing signal generator comprising:
    a signal dividing unit that divides the predetermined cycle into a plurality of partial periods, thereby generating a divided signal, wherein an output level can be set with respect to each partial period, the timing signal generator further comprising:
    a phase shifting unit that generates a phase-shifted signal having a phase shifted from the divided signal when the partial period is shifted accompanying a change between a first state in which a timing clock is output and a second state in which the timing clock is not output; and
    a selecting unit that selects one of the divided signal and the phase-shifted signal according to the phase of the timing clock, wherein the partial period is shifted based on the signal selected by the selecting unit, wherein:
    the signal dividing unit counts one of multi-layer clocks generated by a delay locked loop dividing a clock with the predetermined cycle up to a predetermined number to generate the divided signal, and
    the phase shifting unit generates the phase-shifted signal based on another multi-layer clock that is not counted by the signal dividing unit.

2. The timing signal generator according to claim 1, further comprising a register that receives a designation of a length of each of the partial periods and an output level in each of the partial periods.

3. The timing signal generator according to claim 2, further comprising a reflecting unit that reflects change of the length of the partial period and the output level in the partial period in synchronization with the predetermined cycle when the length of the partial period and the output level in the partial period are to be changed by changing to the values set in the register.

4. The timing signal generator according to claim 1, further comprising a register that receives a designation of a length of each of the partial periods and an output level in each of the partial periods individually for each of a plurality of timing signals.

5. The timing signal generator according to claim 1, further comprising a register that receives a designation of a phase and a pulse width of a timing clock to be output.

6. The timing signal generator according to claim 5, further comprising a reflecting unit that reflects change of the phase and the pulse width in synchronization with the predetermined cycle when the phase and the pulse width are to be changed by changing to the values sit in the register.

7. An image scanning apparatus comprising:
- a timing signal generator that generates a timing signal in synchronization with a predetermined cycle based on a reference clock, the timing signal generator including a signal dividing unit that divides the predetermined cycle into a plurality of partial periods, thereby generating a divided signal, wherein an output level can be set with respect to each partial period;
- a line image sensor driven by the timing signal generated by the timing signal generator;
- a phase shifting unit that generates a phase-shifted signal having a phase shifted from the divided signal when the partial period is shifted accompanying a change between a first state in which a timing clock is output and a second state in which the timing clock is not output; and
- a selecting unit that selects one of the divided signal and the phase-shifted signal according to the phase of the timing clock, wherein the partial period is shifted based on the signal selected by the selecting unit, wherein:
- the signal dividing unit counts one of multi-layer clocks generated by a delay locked loop dividing a clock with the predetermined cycle up to a predetermined number to generate the divided signal, and
- the phase shifting unit generates the phase-shifted signal based on another multi-layer clock that is not counted by the signal dividing unit.

8. The image scanning apparatus according to claim 7, wherein the timing signal generator is integrated with an analog image processor.

* * * * *